US011921778B2

(12) United States Patent
Lowe et al.

(10) Patent No.: US 11,921,778 B2
(45) Date of Patent: *Mar. 5, 2024

(54) SYSTEMS, METHODS AND APPARATUS FOR GENERATING MUSIC RECOMMENDATIONS BASED ON COMBINING SONG AND USER INFLUENCERS WITH CHANNEL RULE CHARACTERIZATIONS

(71) Applicant: Sirius XM Radio Inc., New York, NY (US)

(72) Inventors: Raymond Lowe, North Caldwell, NJ (US); Christopher Ward, Bloomfield, NJ (US)

(73) Assignee: Sirius XM Radio Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,656

(22) Filed: Dec. 28, 2021

(65) Prior Publication Data
US 2022/0405324 A1    Dec. 22, 2022

Related U.S. Application Data

(63) Continuation of application No. 14/725,961, filed on May 29, 2015, now Pat. No. 11,210,338.
(Continued)

(51) Int. Cl.
*G06F 16/638*    (2019.01)
*G06F 16/68*    (2019.01)
*G06N 5/046*    (2023.01)

(52) U.S. Cl.
CPC ............ *G06F 16/638* (2019.01); *G06F 16/68* (2019.01); *G06N 5/046* (2013.01)

(58) Field of Classification Search
None
See application file for complete search history.

(56) References Cited

U.S. PATENT DOCUMENTS 9,383,965 B1 *  7/2016  Qureshi ............. G06F 3/04847
11,210,338 B2 * 12/2021  Lowe ..................... G06F 16/68
(Continued)

OTHER PUBLICATIONS

Celma, O., "Music Recommendation and Discovery," Springer-Verlag, 202 pp. (Year: 2010).*

*Primary Examiner* — Brian M Smith
(74) *Attorney, Agent, or Firm* — Kramer Levin Naftalis & Frankel LLP

(57) ABSTRACT

Systems, methods and apparatus for generating music recommendations based on combining song and user influencers with channel rule characterizations are presented. Such systems and methods output a playlist, which may be delivered as an information stream of audio on a user or client device, such as a telephone or smartphone, tablet, computer or MP3 player, or any consumer device with audio play capabilities. The playlist may comprise various individual audio clips of one genre or type, such as songs, or of multiple types, such as music, talk, sports and comedy. The individual audio clips may be ordered by a sequencer, which, using large amounts of data, generates both (i) user independent and (i) user dependent influencer weightings for each clip, and then combines all of such influencer weightings into a combined play weighting W for a given audio clip, for a given user. Taking the various play weightings $W(U_i, S_j)$, a set of rules may be applied to generate a set of candidates $C(U_i, S_j, T_k)$ to play to User j in each of Time slots k through k+m. Real time playlists may then be generated from the m sets of candidates by application of a set of rules, which may be channel rules, for example. The data used to generate influencer weightings may include
(Continued)

user-specific data including preferences and detailed listening history, audio clip specific data, and data gleaned from various Internet accessible sources, including social media. In some embodiments a feedback loop may be implemented to gauge the accuracy of the dynamically generated playlists and modify the influencer weightings in response.

6 Claims, 14 Drawing Sheets

Related U.S. Application Data

(60) Provisional application No. 62/011,523, filed on Jun. 12, 2014, provisional application No. 62/007,555, filed on Jun. 4, 2014, provisional application No. 62/004,318, filed on May 29, 2014.

(56) References Cited

U.S. PATENT DOCUMENTS

| | | | |
|---|---|---|---|
| 2006/0218187 A1* | 9/2006 | Plastina | G06F 16/4387 |
| 2008/0319833 A1* | 12/2008 | Svendsen | H04L 69/00 |
| | | | 707/999.005 |
| 2009/0228423 A1* | 9/2009 | Hicken | G06F 16/683 |
| | | | 706/54 |
| 2011/0131496 A1* | 6/2011 | Abram | G11B 27/105 |
| | | | 715/730 |
| 2013/0305385 A1* | 11/2013 | Korteweg | G06F 16/68 |
| | | | 726/27 |
| 2014/0280181 A1* | 9/2014 | Rodger | G06F 16/4387 |
| | | | 707/740 |
| 2020/0228596 A1* | 7/2020 | Fuzell-Casey | G06F 16/634 |

* cited by examiner

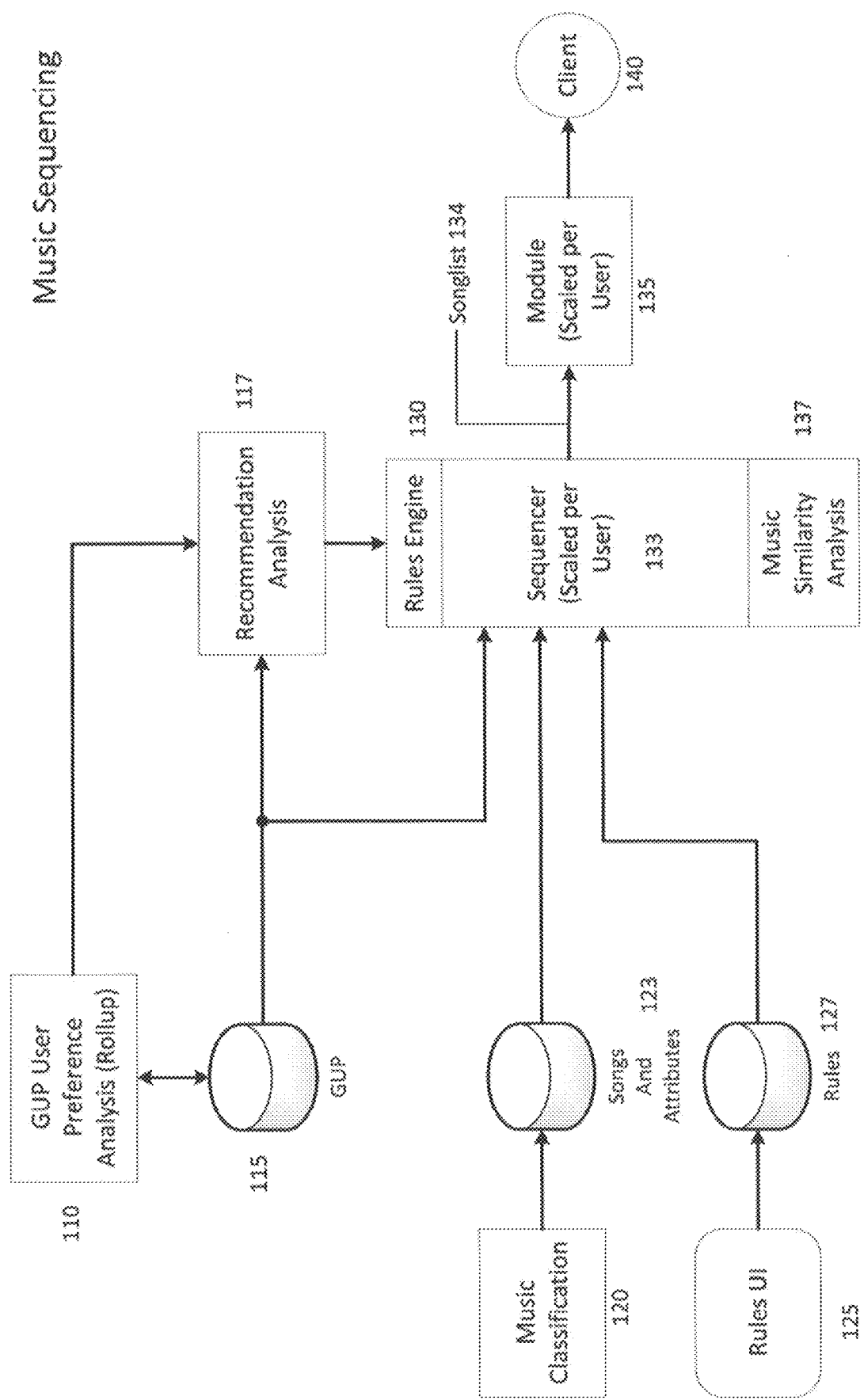

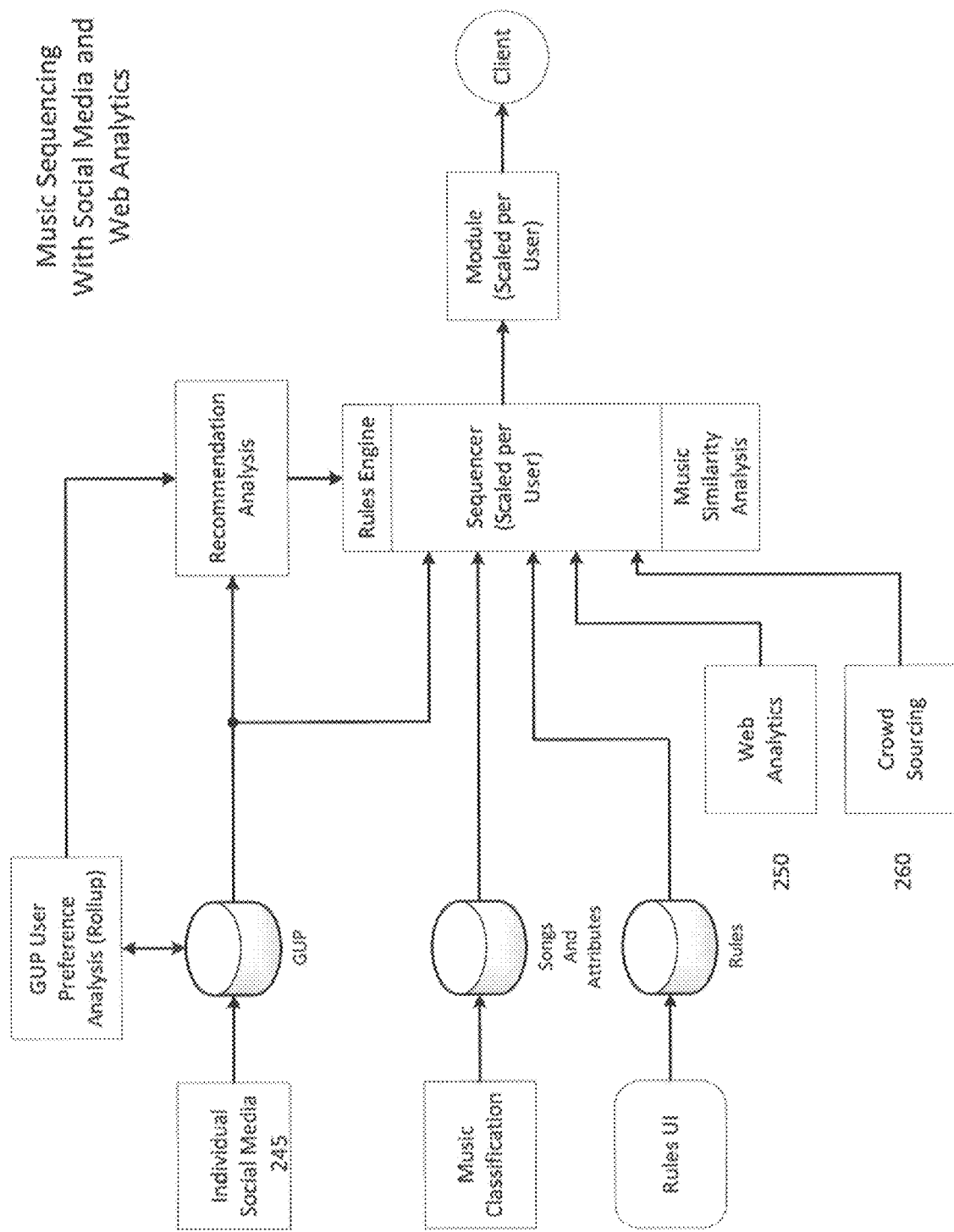

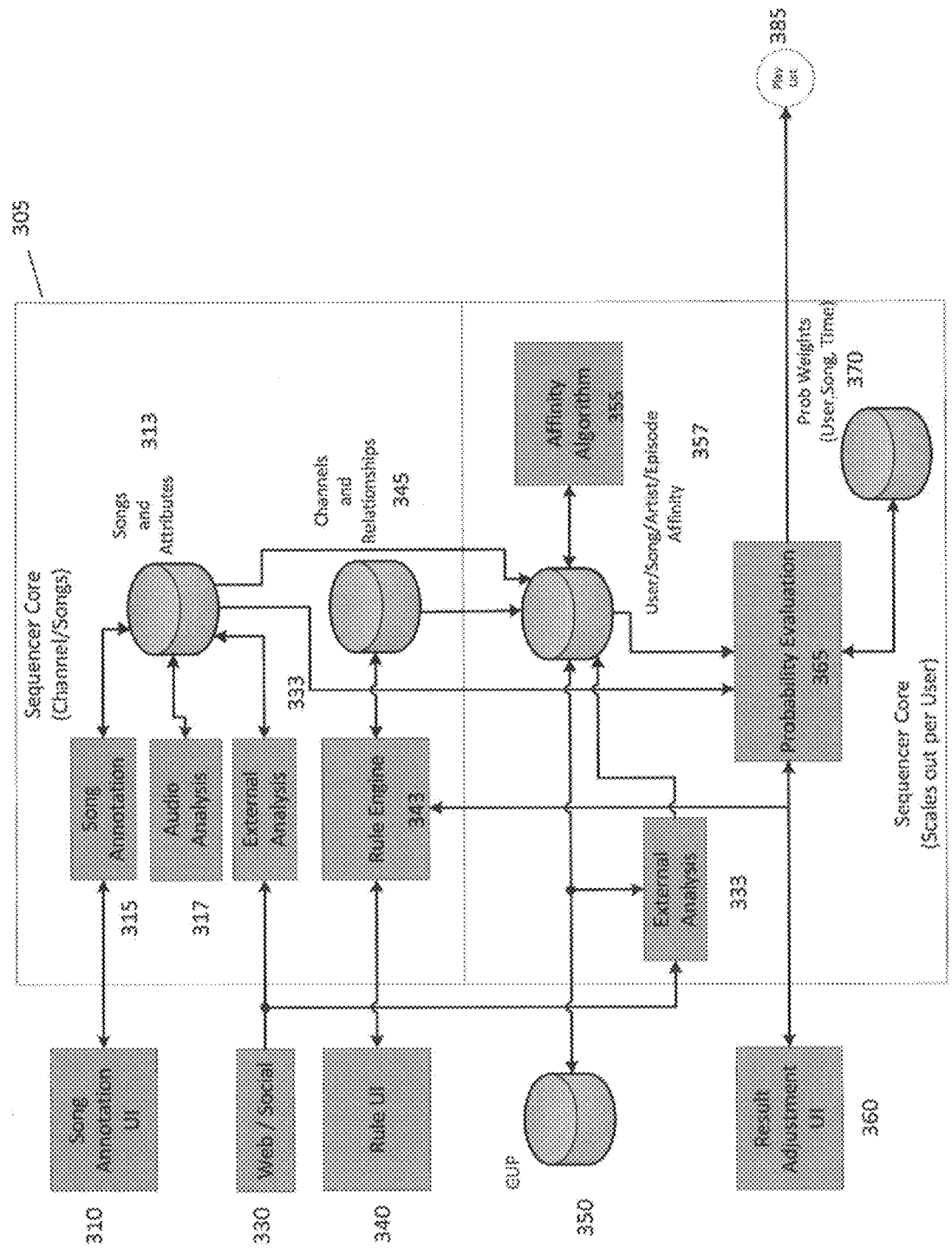
Fig. 3 – Sequencer Core

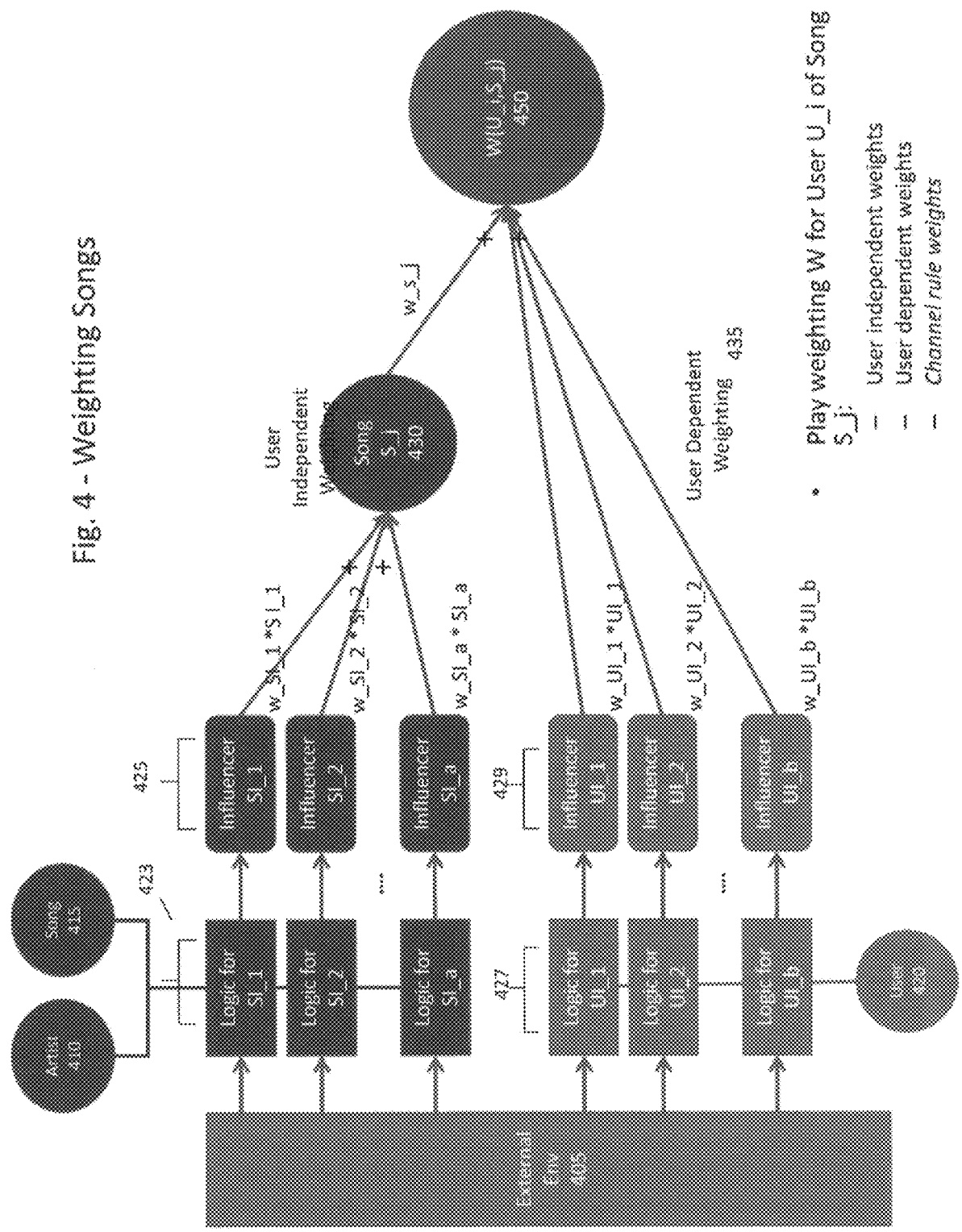
Fig. 4 - Weighting Songs

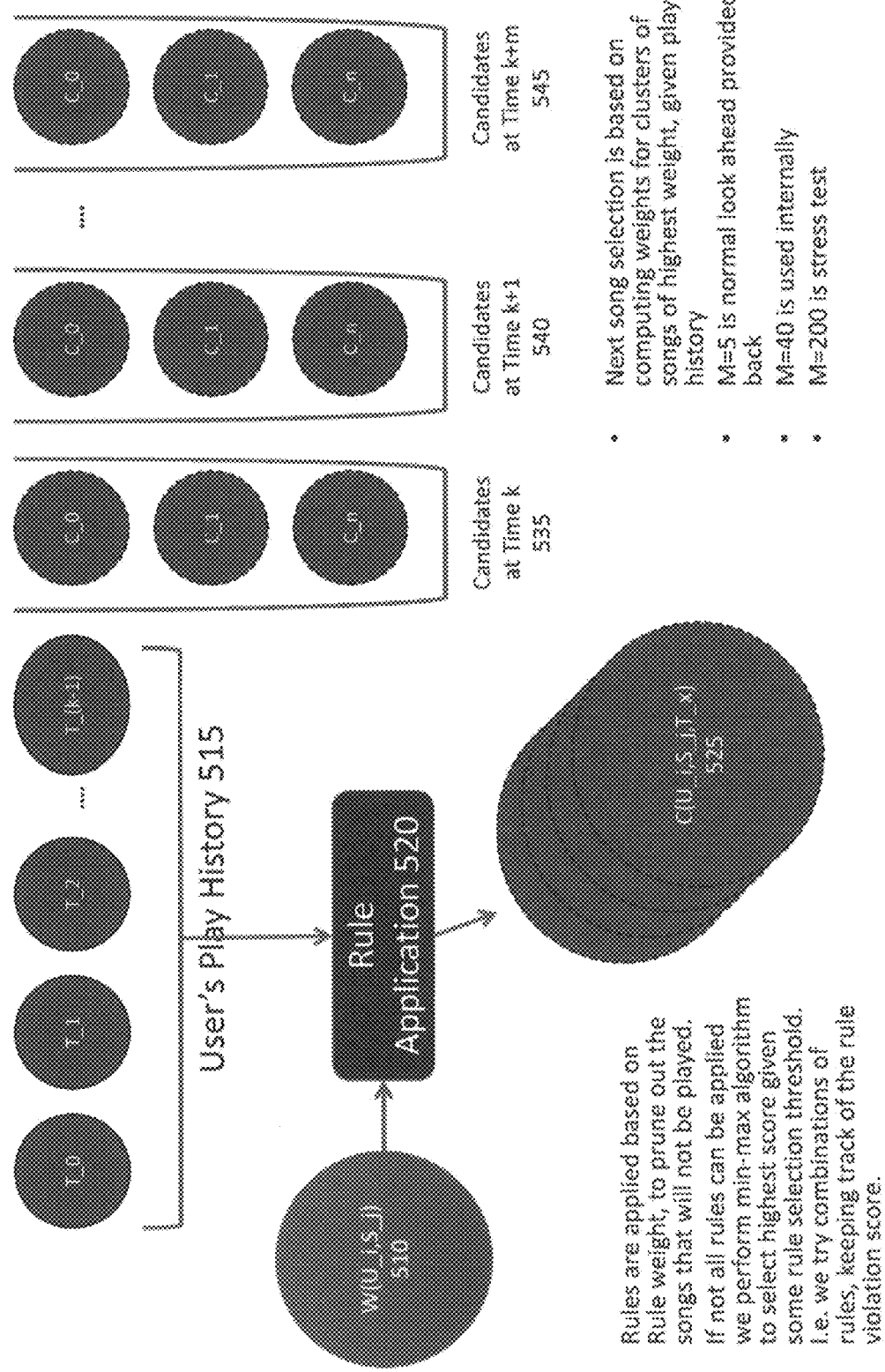

Fig. 6: Channel Rules I — Segue Protection

- Rule:
  - SegueProtection(Attribute, Weight)
    - Attribute (string): Any field in channel characterization
    - Weight (integer): Rule weighting 0..1000
- Interpretation
  - Do not play a song that has a string that matches the field immediately after a song with same string in field.
- Example
  - SegueProtection(Artist, 100) means if at time $t\_{(k-1)}$ we are playing song $i$ that has artist $a$, do not play a song in slot $t\_k$ that has artist $a$. This rule has weighting of 100, i.e. it can be broken.
- Implementation
  - State Space Required assuming we are selecting song at $T\_k$
    - Song field details for $T\_{(k-1)}$

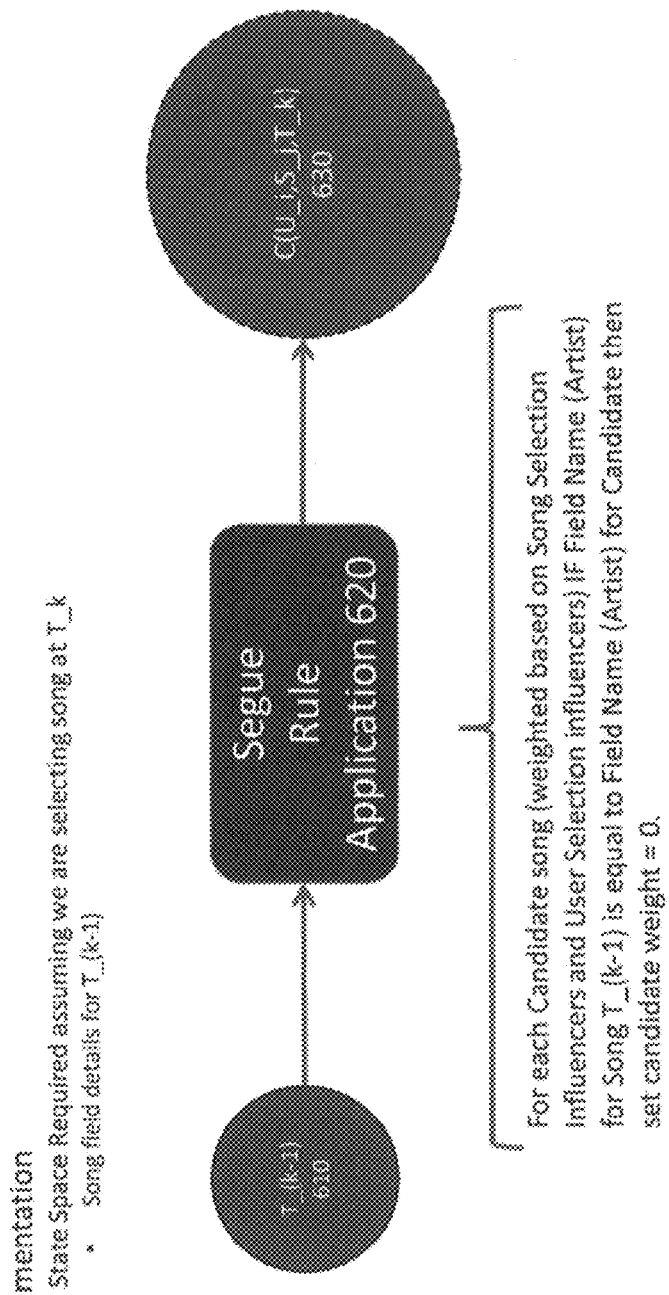

For each Candidate song (weighted based on Song Selection Influencers and User Selection Influencers) IF Field Name (Artist) for Song $T\_{(k-1)}$ is equal to Field Name (Artist) for Candidate then set candidate weight = 0.

Fig. 7: Channel Rules II – SelfSegue Protection

- Rule:
  - SelfSegueProtection(Weight)
    - Weight (integer): Rule weighting 0..1000
- Interpretation
  - Do not play a song that has just played (assumed to mean GUID is same, could be Artist/Title).
- Example
  - SelfSegueProtection(100) means if at time $t\_(k-1)$ we are playing song i, do not play same song in slot $t\_k$. This rule has weighting of 100, i.e. it can be broken.
- Implementation
  - State Space Required assuming we are selecting song at $T\_k$
    - Song field details for $T\_(k-1)$

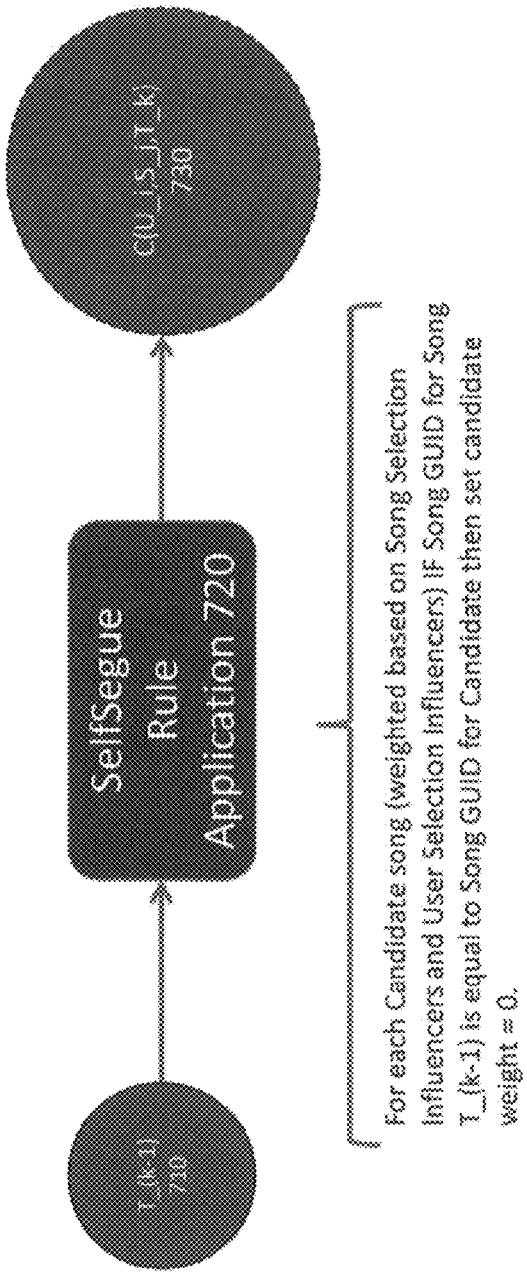

SelfSegue Rule Application 720

For each Candidate song (weighted based on Song Selection Influencers and User Selection Influencers) if Song GUID for Song $T\_(k-1)$ is equal to Song GUID for Candidate then set candidate weight = 0.

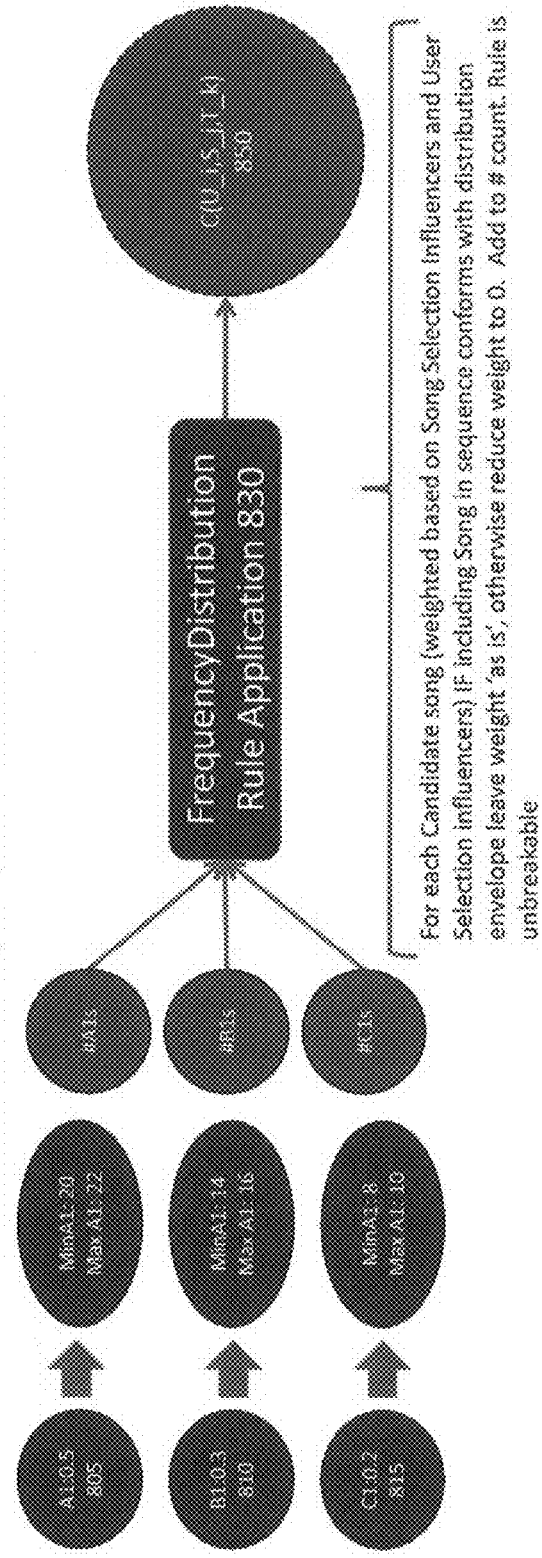
Fig. 8: Channel Rules III – Frequency Distribution

Fig. 9: Sequencer Algorithm V1

```
Lookahead = 5
PlayHistory={}
SlotTime = 0;
For all songs compute S_i;
For User U compute W{U_i,S_j};
ruleset={R0,R1,R2,...};
rulesDropped={};
currentSequence={};

// Generate a playlist
Sequence = ComputeCandidates(W,0,playHistory,ruleset,rulesDropped);
Return Sequence;

// Define ComputeCandidates
TrackList ComputeCandidates(W,T,currentSequence,workingRuleset,rulesDropped)

While (time remaining) {
  For SlotTime = (T .. Lookahead) {
    If (SizeOf(candidateSet = GenerateCandidates(W)) > 0) {
      For Each item in candidateSet apply workingRuleset given currentSequence using State Info. {
        If (All Weights in candidateSet == 0) {       // deadend - will need to relax rules
          Select highest probability scores from candidateSet
          For each song in candidateSet {
            Tracklist(song) = currentSequence;
            Tracklist(song) = ComputeCandidates(W, SlotTime+1, {PlayHistory+S(i)}, ruleset, rulesDropped) + S(i) ; // Breadth First, one method.
          }                                              // Initialize this path
          return Max(Tracklist); // May want to introduce some 'randomness here', e.g. not just Max, but near top.
        }
        else {
          workingRuleset={workingRuleset-lowest rule};   // Might be a smarter way to
          // select rules that are dropped
          rulesDropped={rulesDropped+lowest rule};
          Tracklist = {ComputeCandidates ({PlayHistory},SlotTime,ruleset,rulesDropped)}
        }
      }
    } else
      exit ("error not enough songs");
  }
  return Tracklist;
}

// Define GenerateCandidates
candidateSet GenerateCandidates(W)
Select a set of candidates from W in accordance with some algorithm, e.g. random selection, etc.
Return candidateSet;
```

Fig. 11: Sequencer Algorithm V2

```
Lookahead = 5
PlayHistory={}
SlotTime = 0;
For all songs compute S_j;
For User U compute W(U_i,S_j);
ruleset={R0,R1,R2,...};
rulesDropped={};
currentSequence={};

// Generate a playlist
Sequence = ComputeCandidates(W,0,playHistory,ruleset,rulesDropped);
Return Sequence;

// Define ComputeCandidates
TrackList ComputeCandidates(W,T,currentSequence,workingRuleset,rulesDropped)

While (timeRemaining) {
    if (T == Lookahead) {
        return currentSequence;
    }
    if (SizeOf(candidateSet = GenerateCandidates(W,workingRuleSet}) > 0) {
        for Each item in candidateSet apply MAX(workingRuleset) given currentSequence using State info. {
            if (item in candidateSet failed Rule given currentSequence using State info.) {
                // Assume this is the best we can do, set the weight, and start next iteration
                W(item) = W(item)-weight of Rule that failed
                workingRuleset=(workingRuleset-lowest rule);     // Might be a smarter way to select rules that are dropped
                rulesDropped=(rulesDropped+Rule);
                Tracklist =(ComputeCandidates (PlayHistory},SlotTime,ruleset,rulesDropped)}
            }
            Select highest probability scores from candidateSet;
            For highest probability scores in candidateSet {
                Tracklist(song) = currentSequence;              // Initialize this path
                Tracklist(song) = ComputeCandidates(W, SlotTime+1, {PlayHistory+S(i)}, ruleset, rulesDropped + S(i)) ; // Breadth First, one method
            }
        }
    return Max{Tracklist};  // May want to introduce some 'randomness here', e.g. not just Max, but near top.
    } else return {};
}
return Tracklist;

// DefineGenerateCandidates
candidateSet GenerateCandidates(W, workingRuleSet)
Select a set of candidates from W in accordance with some algorithm, e.g. random selection, etc.
Assign weight to song based on Song/User influencers + SUM(rule weights for workingRuleSet)
Return candidateSet;
```

Fig. 12 – Exemplary Grid View Screen Shot (Showing Song Metadata)

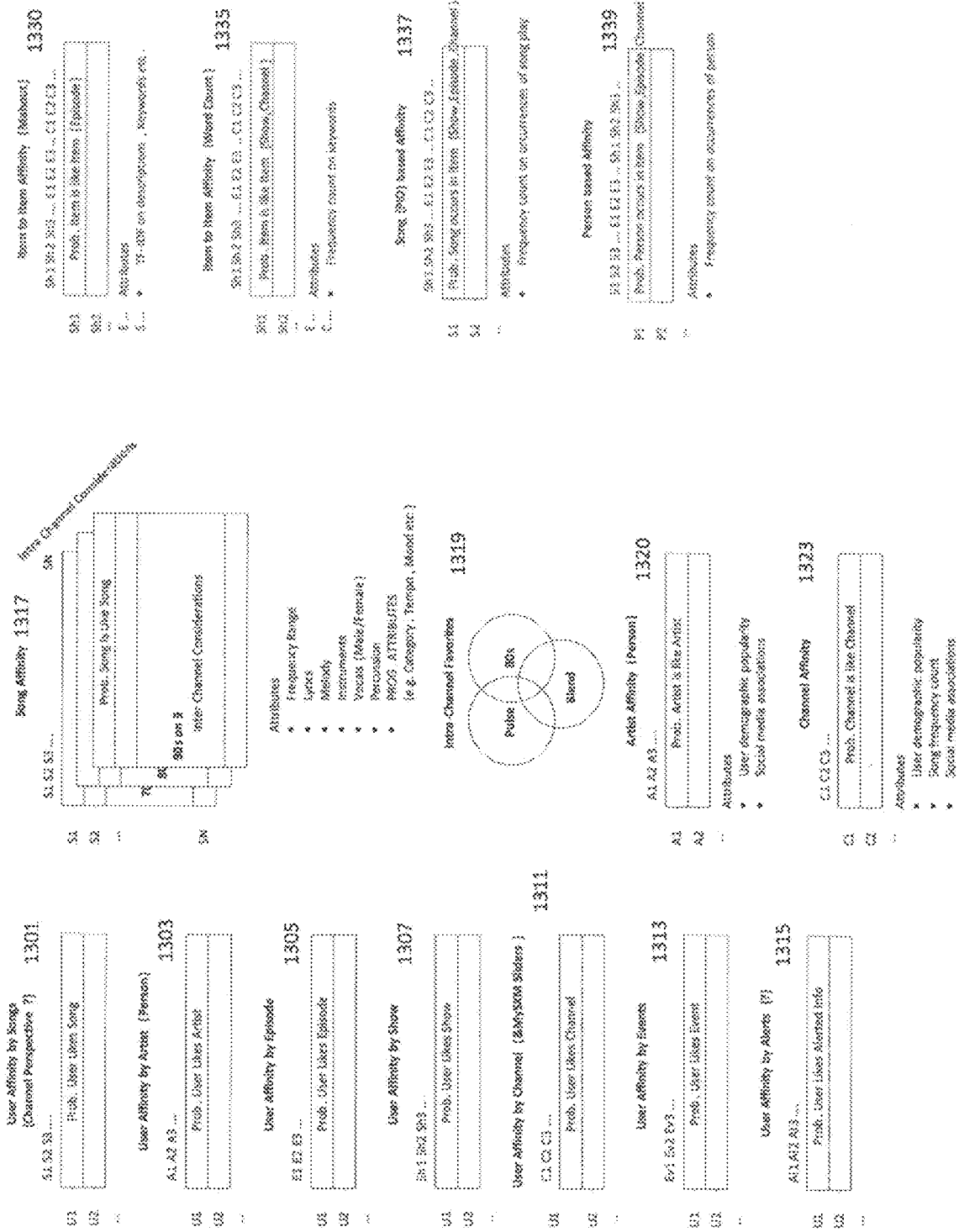

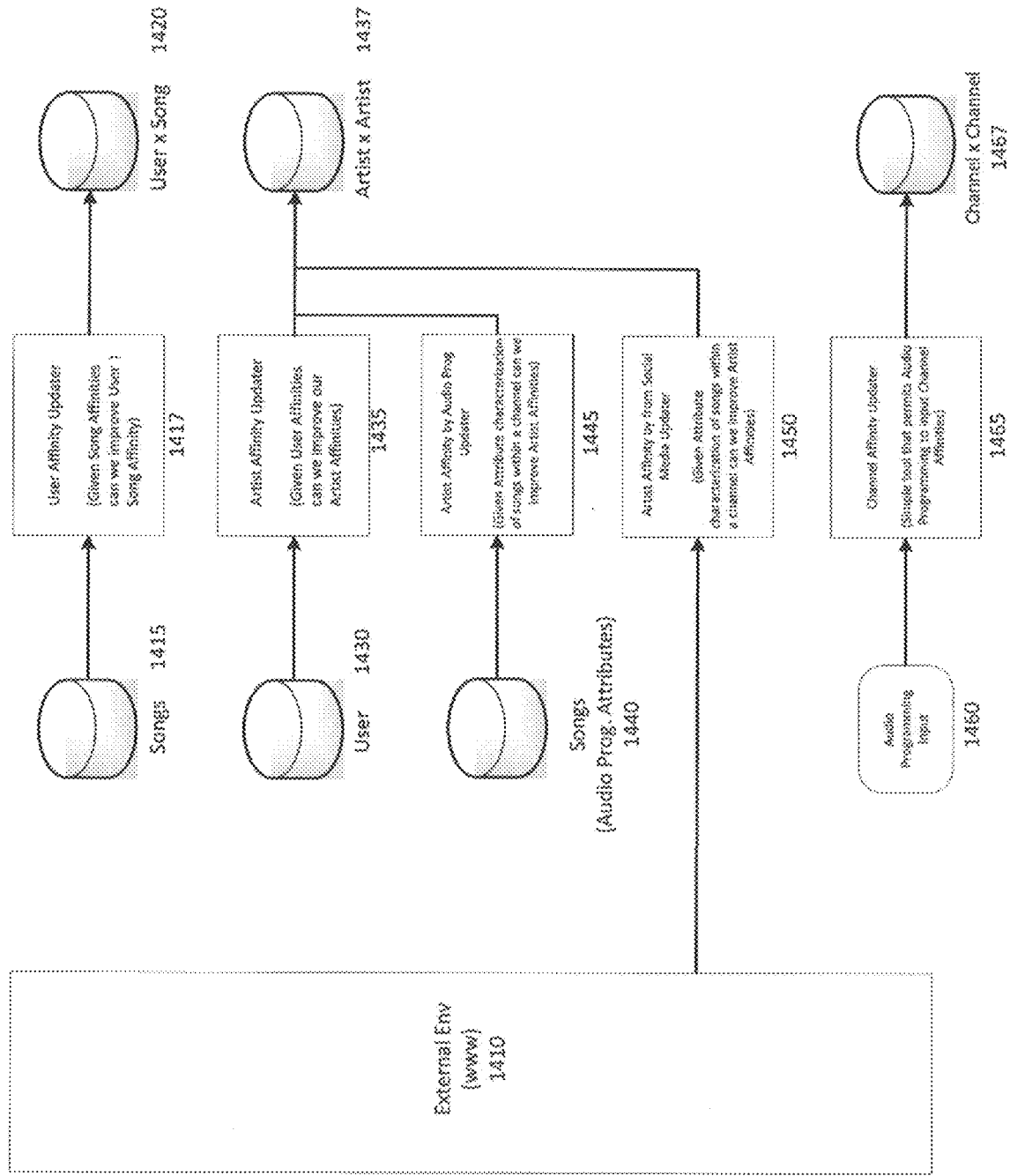

though this application is a continuation of application Ser. No. 14/725,961, filed May 29, 2015, which claims the benefit of each of U.S. Provisional Patent Application Nos. 62/004,318, filed on May 29, 2014; and 62/011,523, filed on Jun. 12, 2014, both of which are entitled "SYSTEMS, METHODS AND APPARATUS FOR GENERATING MUSIC RECOMMENDATIONS BASED ON COMBINING SONG AND USER INFLUENCERS WITH CHANNEL RULE CHARACTERIZATIONS"; and 62/007,555, filed Jun. 24, 2014, entitled "MUSIC RECOMMENDATION AFFINITY"; the disclosure of each of these provisional applications is hereby incorporated herein by reference as if fully set forth.

SYSTEMS, METHODS AND APPARATUS FOR GENERATING MUSIC RECOMMENDATIONS BASED ON COMBINING SONG AND USER INFLUENCERS WITH CHANNEL RULE CHARACTERIZATIONS

CROSS-REFERENCE TO RELATED APPLICATIONS

This application is a continuation of application Ser. No. 14/725,961, filed May 29, 2015, which claims the benefit of each of U.S. Provisional Patent Application Nos. 62/004,318, filed on May 29, 2014; and 62/011,523, filed on Jun. 12, 2014, both of which are entitled "SYSTEMS, METHODS AND APPARATUS FOR GENERATING MUSIC RECOMMENDATIONS BASED ON COMBINING SONG AND USER INFLUENCERS WITH CHANNEL RULE CHARACTERIZATIONS"; and 62/007,555, filed Jun. 24, 2014, entitled "MUSIC RECOMMENDATION AFFINITY"; the disclosure of each of these provisional applications is hereby incorporated herein by reference as if fully set forth.

TECHNICAL FIELD

The present invention relates to digital media delivery, and in particular to systems and methods for implementing a music recommendation and sequencing service. One exemplary use is in personalized music services delivered over a data connection, where for each client or user a unique playlist is dynamically generated and played.

BACKGROUND OF THE INVENTION

Media delivery has historically followed a broadcast type model, where users/consumers all receive the same programming. With the introduction of media compression and file based delivery, various types of media are commonly downloaded directly to a user's device, such as, for example, an iPod, digital media player, MP3 player, PC, tablet, cellular phone, smart phone, etc., and various hybrid devices or devices with equivalent functionalities. This leads to the opportunity to deliver personalized media streams to each individual user or consumer over the individual communications channel to that user.

The opportunity is even further facilitated by the ability to collect, process and analyze large amounts of data, both user specific to a user (e.g., preference settings, use and listening history, etc.), and to a given demographic or sub-demographic as a whole, or a song/artist in general (e.g., "buzz", temporal relevance, clusters of similar songs, tempos, genres, etc.).

With such new opportunities also come new challenges. Such large amounts of data can and should be used to granularly create specific songlists for each individual user, so as to maximize the user's experience, and thus create more and more loyalty to music services that create such better and more optimal playlists. However, it is an often gargantuan task to manage the large data collection, storage and algorithmic processing necessary to do this in a real world commercial context, for large scale numbers of users.

What is needed in the art are methods to collect, store, process and analyze such data, to generate playlists and recommendation engines for such playlists that optimize a user's positive experience and "stickiness" to a given channel or the service as a whole, and algorithms to measure the effectiveness of such recommendation engines and playlists and dynamically modify them in a feedback loop.

BRIEF DESCRIPTION OF THE DRAWINGS

It is noted that the patent or application file may contain at least one drawing executed in color. If that is the case, copies of this patent or patent application publication with color drawing(s) will be provided by the U.S. Patent and Trademark Office upon request and payment of the necessary fee.

FIG. 1 illustrates an exemplary system for a music sequencing service according to an exemplary embodiment of the present invention;

FIG. 2 depicts the exemplary system of FIG. 1 with certain extensions to improve its accuracy using social media data;

FIG. 3 provides further details of the sequencer core shown in FIGS. 1 and 2 according to exemplary embodiments of the present invention;

FIG. 4 depicts an exemplary process for calculating the influence or weightings of songs from both a user-independent and a user-dependent perspective, and then combining them to obtain an overall weighting according to an exemplary embodiment of the present invention;

FIG. 5 illustrates the influence of channel rules upon song candidate selection at various time slots according to an exemplary embodiment of the present invention;

FIG. 6 illustrates application of a first exemplary channel rule, segue protection, according to an exemplary embodiment of the present invention;

FIG. 7 illustrates application of a second exemplary channel rule, self-segue protection, according to an exemplary embodiment of the present invention;

FIG. 8 depicts a third exemplary channel rule, frequency distribution, according to an exemplary embodiment of the present invention;

FIG. 9 depicts exemplary pseudocode for an exemplary sequencer algorithm according to an exemplary embodiment of the present invention;

FIG. 11 depicts exemplary pseudocode for an alternate exemplary sequencer algorithm according to an alternate exemplary embodiment of the present invention;

FIG. 12 is an exemplary screen shot of a grid view of an exemplary music service interface, where a user sees what is playing on each channel;

FIG. 13 illustrates exemplary affinities between various content items, as well as between users and content items, according to exemplary embodiments of the present invention; and FIG. 14 illustrates a sample affinity computation according to exemplary embodiments of the present invention.

SUMMARY OF THE INVENTION

Figure 10:
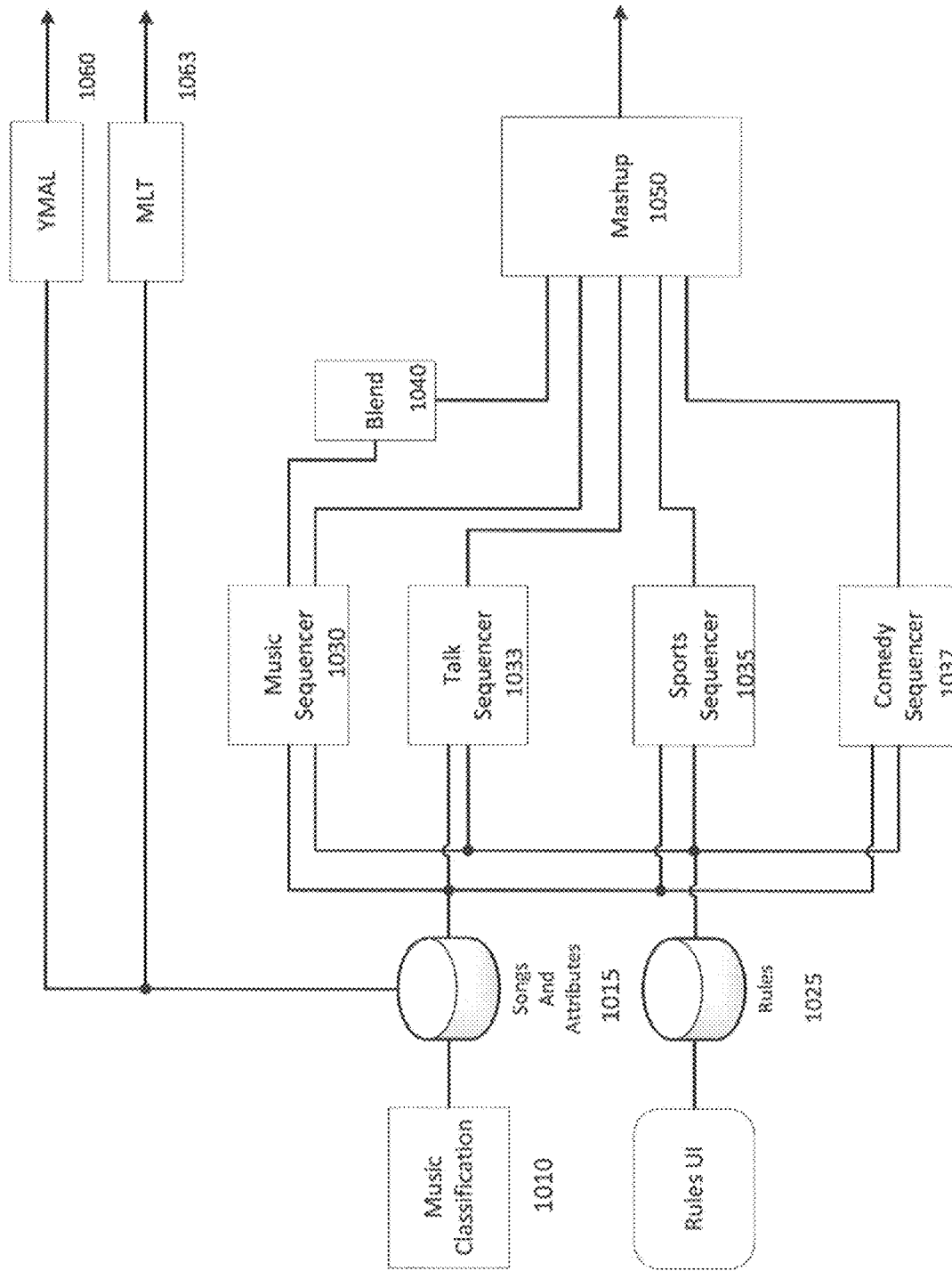
FIG. 10 illustrates combining sequencer outputs of various content types, including music, talk, sports, and comedy, to generate a genre varied audio program according to an exemplary embodiment of the present invention.

Systems, methods and apparatus for generating music recommendations based on combining song and user influencers with channel rule characterizations are presented. Such systems and methods may output a playlist, which may be delivered as an information stream of audio, for example, on a user or client device, such as a telephone or smartphone, tablet, computer or MP3 player, or any consumer device with audio play capabilities. The playlist may comprise various individual audio clips of one genre or type, such as songs, or of multiple types, such as music, talk, sports and comedy. The individual audio clips may be ordered by a sequencer, which, using large amounts of data, generates both (i) user independent and (i) user dependent influencer weightings for each clip, and then combines all of such influencer weightings into a combined play weighting W for a given audio clip, for a given user. Taking the various play weightings W(Ui, Sj), a set of rules may then be applied to generate a set of candidates C(Ui, Sj, Tk) to play to User j in each of Time slots k through k+m. Real time playlists may then be generated from the m sets of candidates by application of a set of rules, which may be channel rules, for example. The data used to generate influencer weightings may include user-specific data including preferences and detailed listening history, audio clip specific data, and data gleaned from various Internet accessible sources, including social media. In some embodiments a feedback loop may be implemented to gauge the accuracy of the dynamically generated playlists and modify the influencer weightings in response.

DETAILED DESCRIPTION OF THE INVENTION

As required, detailed exemplary embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as illustrative examples for the claims and as a representative basis for teaching one skilled in the art to variously employ the present invention in virtually any appropriately detailed structure. Further, the terms and phrases used herein are not intended to be limiting; but rather, to provide an understandable description of embodiments of the invention.

The terms "a" or "an", as used herein, are defined as one or more than one. The term plurality, as used herein, is defined as two or more than two. The terms another, or alternate, as used herein, are defined as at least a second or more. The terms including and/or having, as used herein, are defined as comprising (i.e., open language). The term coupled, as used herein, is defined as connected, although not necessarily directly, and not necessarily mechanically. The term "song", as used herein, is understood to be exemplary, and to also include any type of audio content, or even audio-video content, that may be provided to a user in a content delivery system such as a personalized music service.

In exemplary embodiments of the present invention, various techniques may be implemented to dynamically generate music or audio playlists to individual users. One exemplary context to which the techniques of the present invention are applicable is a "personalized channel" media distribution service, or a personalized music service such as, for example, Spotify™, Pandora™, Grooveshark™, and various others. For example, a media distribution company, such as, for example, an enhanced iTunes™ type service, or, for example, the personalized channel service of assignee hereof, Sirius XM Radio Inc., can offer its users personalized playlists that are organized by genre, type or channel. Such playlists can, for example, further be modified by user preferences, both explicit and/or implicit. Implicit user preferences, may be captured by "preference engines" such as are touted by the Pandora™ service and similar music delivery services. In such personalized channel or personalized playlist services, each individual user can, for example, have his or her own set of media files that the service provides, via the Internet or other data connection.

FIG. 1 illustrates an exemplary system for implementing a music-sequencing service according to an exemplary embodiment of the present invention. With reference thereto, beginning at the top left of the figure, there is shown a Global User Preference ("GUP") database 115. A global user preference contains all of the data that a system has available to it regarding a given user, from various sources, as may be processed. The GUP database 115 may be populated by a GUP user preference analysis or "rollup" module 110, the output of which, along with the GUP database, may be fed to a recommendation analysis module 117, as shown.

Continuing down the left side of FIG. 1, a Music Classification process 120 is shown, which results in the creation of a database of Songs and Attributes 123. In exemplary embodiments of the present invention, a music classification process 117 can be implemented by humans, by automated processes, or by various combinations of both. Such a process generally uses a taxonomy of song attributes, which may be (i) specific to a particular channel being offered (e.g., "70s Music"), or (ii) specific to a set of channels (e.g., "70s Music" "80s Hits" and "Classic Vinyl"), or (iii) a universal taxonomy, by which *any* song or audio clip may be categorized and annotated. The Songs And Attributes database 123 can contain, for example, a record, for each song, of that song's various attributes, each of which may further contain a score or value. For example, a given song may be a ballad, have a genre, have a tempo, or a relative tempo to its genre, may be in either a "happy" key, a "pensive" key, or a "melancholy" one, to list just a few examples of the many ways one may characterize a song. Further to the specificity of song attributes to a particular channel or domain noted above, a tempo may be a "global" variable, or it may be relative to a channel, or genre, as noted. Thus, "Up Tempo" in the context of a Heavy Metal or Hard Rock channel or genre means something completely different in a Show Tunes, or Cole Porter, channel or genre, for example. The same issue applies to key categorizations, mood categorizations, etc.

Finally, at the bottom left of FIG. 1 there is shown a rules user interface, or "Rules UI" 125. This interface may be used to create a number of rules 127 which can then be applied in various music sequencing processes, as described in greater detail below. The rules may be stored in a Rules Database 127, and may include various song attributes as inputs, such as, for example, "never play two melancholy ballads one after the other." Such a rule may also have a "breakability" score. This metric indicates to what degree, if any, either in abstract, or, in a given channel or context, the rule may be broken. For example, at certain times of the week, such as, for example, late Saturday nights, on a country music channel, multiple melancholy ballads may actually be desired, in which case the rule may routinely be broken in that context. At other times, or on other channels, it may never be broken. Rules UI 125 is usually accessed, for example, by an expert, such as a programming director, who may create a series of rules designed to insure varied and interesting content for users, as described below. These rules may be stored in Rules Database 127, as noted.

Continuing with reference to FIG. 1, the GUP Database 115, Songs And Attributes Database 123, and Rules Database 127 may, for example, all be input to the Sequencer 133, which itself may include a Rules Engine 130 and a Music Similarity Analysis module 137, as shown. Sequencer 133 may output a Songlist 134 that provides a next track for the client device to play, along with some limited "lookahead" as to future tracks to play if the user takes no intervening action. The lookahead is a sequenced set of N tracks to play following the next track, where N is an integer that may be selected by a system, service or even user. The lookahead may be used by the client device to assist in caching the start of future songs as a mechanism to provide smooth transitions, should the listener wish to skip a track or otherwise influence the songlist. As shown, Songlist 134 is provided form the Sequencer to a Module 135 which is responsible for annotating the song list with client necessary metadata, such as, for example, a music content manifest, location of the artist image and song lyric information, which is scaled per user. The output of Module 135 may be provided to a Client 140 in the form of a metadata enriched playlist, i.e., a series of songs to be played to the user with associated metadata needed for display, searching, etc. (It is noted that in this disclosure, the term "Client" refers generally to a client device playing a sequence of songs or other media content to a user, which may also be referred to as a "client device.") FIG. 2 illustrates an enhanced version of the exemplary music sequencing system of FIG. 1. Therefore, only the enhanced modules, or the extensions included in the system of FIG. 2 over and above those of the system of FIG. 1 will be described. Other than those extensions, the system of FIG. 2 is identical to that shown in FIG. 1. The extensions include three modules or blocks. One of these is an Individual Social Media module 245, shown to the left of the GUP Database, as an input to it. In exemplary embodiments of the present invention, analysis of social media postings and interactions of each user can be performed to learn additional relevant information that is not yet known about each of (i) the user, (ii) his or her particular social network, and (iii) his or her demographic or cluster. In general, without social media processing an exemplary system's knowledge of a user has limitations. It will generally know (i) what channels a user listens to and for how long, (ii) what the user's preferences are as reported via a user interface, and also (iii) correlations between song affinities for other users in the system. Using the latter knowledge, a system may therefore create statistical affinities such as, for example, if most users who like song A also like song B, it is probable that the given user will also like song B if she likes song A. However, as can be appreciated, such correlations are even more informative, and thus more predictive, if applied within clusters of a particular demographic or socio-economic circle, or other similarity cluster or affinity group, where the users within the circle, cluster or demographic are similar in some way relevant to musical (or other audio) taste predictability, such that song affinities are likely to be shared by all members of the cluster.

However, extending beyond what the system itself may know form interactions of the various users of the system, in exemplary embodiments of the present invention, if one tracks the actual activity of a user on, for example, Facebook, Twitter, Pinterest, Whatsapp, Google+, chat rooms, online groups, etc., and other social media outlets where people may actually talk about a song, comment on somebody else's posting of a song, speak about related songs or other work of the same artist, or discuss different versions of a song as being preferred, such as, for example, acoustic, studio produced, or recording of a live performance, or original recording or a subsequent cover or remix, a lot of information as to preferences, perception of genre boundaries, similarities and affinities, can be gleaned for each user and his or her social circle(s) and demographic(s). If that information is all aggregated and processed across an exemplary system, and regularly updated and tested for predictability, GUP Database 115 can be significantly enhanced.

Continuing with the enhancements shown in FIG. 2, at the bottom center of the figure there are shown two other extension modules, one called Web Analytics 250 and the other termed Crowd Sourcing 260. These two modules involve scouring the World Wide Web, social media outlets, etc., and essentially any forum or platform where users may converse, chat, post comments and likes/dislikes, etc., for postings of relevant and informative information regarding song, artist, or other relevant audio popularity, or relevance, and to whom. This data can, for example, be processed along lines similar to the concept discussed above: i.e., that similar users will have similar tastes, and that what "similar" means as regards individual users is best obtained by "letting the data speak"—as opposed to making a priori assumptions.

Thus, if the crowd, "clique" or demographic, whether geographical, socio-geographical, ethnic, age-based, shared language or national origin, or any other meaningful sub-demographic, likes a song, odds are that other users that belong to that cluster will also like the song. Various affinities for songs or "buzz" can be obtained by scraping the World Wide Web, or other Internet network, as to various sites that may discuss music, sell music, facilitate downloading of music, allow people to comment on music being sold, shared or downloaded, present advertisements for music, post music videos or just audio, such as You Tube, or capture trends in music. Global preference indicators, such as Google Trends, for example, may also be analyzed for relevant information. Crowd-sourcing can access affirmative statements of many, many people as to what songs are popular or useful or have "buzz." For example, when a movie is about to be released, or is first released, and it features a song as the ballad or signature of the movie, as is often the case, there is often a lot of "buzz" before, during, and after the premiere weekend for that film. By analyzing this build-up and initial reaction data (akin to measuring an "impulse response" to a given input signal) it can be determined exactly how popular the film is, as well as a probability as to how popular the film and the signature song (or other audio clip) will ultimately be. A smaller, but similar effect, is often seen when a given song wins an award such as an Academy Award or a Grammy, and it re-enters the public zeitgeist, so to speak. This information can be used to enhance music sequencing and recommendation, as shown.

As noted, as regards all other elements and modules of FIG. 2, they are the same as those presented in FIG. 1 and will not be described again.

FIG. 3 illustrates details of the Sequencer Core shown in FIGS. 1 and 2. The Sequencer 305 is naturally divided into two parts, separated by a horizontal line, as shown (about midway along the height of FIG. 3). The top portion deals with channels and songs, and the bottom portion deals with per user data. As noted in FIGS. 1 and 2, a portion of the sequencer scales out in accordance with the number of channels, rules per channel, songs per channel and attributes per song, and this is illustrated in the top part of the Sequencer in FIG. 3; similarly, the lower portion of Sequencer 305 scales out in accordance with the number of users. Sequencer 305 is responsible for maintaining data associated with the dynamic context (state data) associated with all active users, along with the static context (state data) associated with affinities between all users, both active and inactive. These static and dynamic state data are used by Sequencer 305 to make music recommendations (i.e. generate play lists) using an evaluation of the probability that a particular song is well suited for that user, at that time, on that channel, given the users preferences, play history, and channel specification (e.g. rules and song list).

With reference to FIG. 3, the Sequencer includes a number of databases, for example, one for each of (i) Songs and Attributes 313, (ii) Channels and Relationships 345, (iii) User/Song/Artist/Episode Affinity 357, and (iv) Probability Weights 370, which stores the then existing probability that particular songs are suited for playout in a particular time slot to a specific user. Thus, its data is expressed in terms of a given user to a specific or particular song during that time slot. Probability Weights database 370 contains song candidates, given a historical playlist, coupled with a conjecture of sequences of songs played by a particular user. I.e., it reflects sequences of songs that conform to a greater or to a lesser degree with the rules of the channel, and are weighted to some degree to reflect the perceived user's preferences. Sequencer 305 outputs an actual playlist 385 that is presented to the user, which is the "best" of these conjectured playlists, as described in greater detail below. Finally, external to the sequencer core there is shown the GUP database 350, which was previously described above.

FIG. 3 also illustrates that the sequencer core includes a number of modules. These include, for example (i) a Song Annotation Module 315, (ii) an Audio Analysis Module 317, (iii) an External Analysis Module 333, (iv) a Rule Engine Module 343, (v) an Affinity Algorithm Module 355 and (vi) the candidate song Probability Evaluation Module 365 The Song Annotation Module 315 takes input from the Song Annotation UI 310 and associates various annotation field values with a particular song based on input from, for example, an expert audio programmer (which may be, as noted above, either an automatic process or a combination human/machine process using machine intelligence of various types, including pattern matching). Typically, a song will be annotated with distinct attributes for each channel that the song is associated with. Therefore the set of operations associated with the Song Annotation Module 315 can be read/write attributes for a particular song within a particular channel. The song annotation data can include a variety of attributes about a song that can be used in various algorithms within the sequencer.

Audio Analysis Module 317 is responsible for providing an objective analysis of a song (distinct from human/machine annotation of a song as described above) and can define attributes for a song such as, for example, tempo, maximum and minimum frequencies, energy of the song, instrument extraction, etc. Additionally, for example, the Audio Analysis Module 317 may perform speech to text transcription as additional attribute annotation. The External Analysis Module 333 is defined by a set of influence collectors (as described in more detail with reference to FIG. 4) and is responsible for providing weights to selected attributes based on particular songs (song weighting) or users (user weighting of particular songs). It is shown twice in FIG. 3, inasmuch as it interacts with both the Songs and Attributes Database 313, as well as the User/Song/Artist/Episode Affinity Database 357. There is also provided a Rule Engine Module 343 which can itself be populated by a Rule User Interface 340, as described above in connection with FIG. 1. It is noted that although FIGS. 1 and 2 show a rules database, it is actually the Rule Engine Module 343 within Sequencer 305 that makes the decision as to which rules to fire, in which order, and which rules have which level of stringency or "breakability", i.e., if, and to what degree, a given rule may be broken and under what circumstances.

There is also provided in the Sequencer Core 305 an Affinity Algorithm 355, which measures the affinity of a given song to a given user. The Affinity Algorithm 355 may leverage user data (from the Global User Profile or GUP) and the song characterizations (from the song and attributes database) to establish the following two relationships: (i) Song to Song affinity, and (ii) User to User affinity. Song to Song affinity identifies songs that are considered "similar" to one another and can be accomplished using algorithms such as, for example, minimum cosine distance between songs for a particular set of attributes. User to User affinity identifies users that are considered to have similar affinities for particular songs, and can be accomplished using algorithms such as, for example, minimum cosine distance between users for a set of songs (e.g. given that we ascribe weights to the user preferences for all songs, two users are considered "similar" based on their liking similar songs).

Continuing with reference to FIG. 3, Probability Evaluation Module 365 forms the core of Sequencer 305. It calculates the probability for each song in a playlist 385 for a particular user, given the constraints of the rules for the given channel. Performance of the Probability Evaluation Module 365 can be modified by the Result Adjustment user interface 360. It is also noted that the Affinity Algorithm Module 355 may further find Song to Artist, User to Artist, Artist to Artist (e.g., if you like Frank Sinatra, you will also like lesser known "crooners", or more modern ones, such as Harry Connick, Jr., for example), Episode to Episode, and similar affinities, depending upon the granularity a given exemplary system is desired to implement. It is noted that the Sequencer Core, and the Music Sequencing System of FIGS. 1-2, itself may be provided on a server, which then outputs a playlist that is streamed or pre-sent to a user's client device and stored for later playout, over a data communications network. Alternatively, some or all of the Sequencer Core, and the Music Sequencing System of FIGS. 1-2 itself, may be provided in an intelligent client device.

FIG. 4 illustrates details of an exemplary song weighting process according to some embodiments of the present invention. It is here noted that although many of the examples in this disclosure are in terms of song weightings, this is for convenience of illustration. It is understood that the disclosed weighting methods may be applied to any type or genre of programming, such as talk, news, sports, comedy, etc., as shown, for example, in FIG. 11. Thus, any audio/video clip may be similarly weighted and such weightings may be used to generate a playlist. Continuing with reference to FIG. 4, there are two main processes depicted for weighting songs. One is a User-Independent Weighting 430, shown on the upper portion of FIG. 4, which is a function of Artist 410 and Song 415, and can also include other attributes of the audio content. The other major weighting method is User-Dependent Weighting 435, which is based on user specific attributes. These are represented collectively by the input "User 420", shown at the bottom of the figure. Weightings derived from each basic method are then all combined into an ultimate play weighting $W(U\_i, SJ)$ 450, as shown at the far right of FIG. 4. As shown for the example of the user independent weightings, an aggregate User Independent Weighting 430 may be calculated as a net weighting for each song $S\_j$. Given a particular song, it is then possible to compute a User Dependent Weighting 435 based on an understanding of the user's preferences and tastes, along with the external environment. It is also possible to aggregate a User Dependent Weighting 435 for User Ui for a particular Artist, although this is not shown, and in some embodiments this intermediate aggregate step may be omitted. By combining the aggregate User Independent Weighting 430 for song Sj, with elements of the aggregate User Dependent Weighting for user Ui for song Sj, one may obtain an overall weighting W 450, which may be expressed as W(Ui, Sj), or the overall weighting for (i) a given user Ui, of (ii) a given song Sj. This value W forms the basis of the computation for playlist probabilities; i.e., it is the same as "Probability Weight (user, song, time)" shown in the bottom right of FIG. 3, assuming that there were no rules associated with the playout of content.

A. Song Selection Influencers—User Independent

The process of weighting of songs, based on a set of user-independent song selection influencers, as shown in the upper portion of FIG. 4, is next described in detail. In exemplary embodiments of the present invention, each song can be weighted for playout delivery based upon a number of song related selection influencers. Such exemplary selection influencers can be, for example, as follows:

1. Time/Basic Dayparting: some music is 'better suited' to selected times of the day.

2. Song Social/Crowd/Web Scraping: A user's interest in a given song can be gleaned from an analysis of social media, crowd sourcing and web scraping sites. For example, an exemplary algorithm may look at Chart Position, No. of Weeks, Google Trending, Q index, chart lists of popular movies and associated songs, etc., to gauge the then prevalent "buzz" or popularity of a given song, to a given demographic group or groups.

3. Song Popularity Distribution: For a given song there is a natural distribution (e.g., bi-exponential) as to how popular it was from when it came out and subsequently. This "popularity function(t)" can be defined by a few parameters, and can be used to project or estimate how popular the song will remain going forward. The distribution plus the parameters can be used to provide a 'weight' for this song.

4. Revival Perspective: Selected Artists tend to have initial offerings and then subsequently go through one or more periods of revival. These revivals can be based on either an event (e.g., Michael Jackson's estate releases new show footage, or, for example, the Four Seasons, Billy Joel, or Motown are featured in a Broadway play, a movie is made about a past star, such as Bobby Darin, Ray Charles, etc.), or period, such as, for example, Glam Rock being 'in' again.

5. Resurgence of Artist: Based on a contemporary perspective it is seen that a particular artist is going thru a renaissance. This is understood as more significant than a temporal revival, as described above, but there can be some overlap.

6. Societal Events: There is an overall impact on songs based on Global Headlines, such as Consumer Sentiment, Financials, etc.

7. Artistic Period: A recording artist typically goes through several distinct periods, such as, for example, early, middle, and late. These periods can be captured and used to influence popularity or desirability, and thus weighting.

8. Aggregated Internal Global User Profile Statistics: This is where a music service notices an increased popularity of some type, epoch or genre of music across many users of the service, such as, for example, many users now listening to 70s channels.

B. User Based Selection Influencers—User Dependent

The process of weighting of songs based on a set of user-dependent song selection influencers, as is illustrated in the bottom portion of FIG. 4, is next described in detail. In exemplary embodiments of the present invention, each song can also be weighted for playout delivery based upon a number of person-related selection influencers, derived from data known about a user from the GUP, as described above. Such exemplary selection influencers can be, for example, as follows:

1. Channel change: If the user changes a channel they may either dislike the song, or dislike/be bored with the channel. Acquiring detailed statistics as to user listening behavior allows an exemplary system to understand the significance of user changes in listening patterns over time.

2. Channel change From Grid View/Song or Channel Metadata: A user is likely expressing an interest in a particular song when they change from an existing channel to a new channel based on selecting the channel from PDT/PAD data (i.e., the song metadata). For example, in the channel view of graphical representations, when the browser is in a "grid view" he or she can see what is playing on each channel. An example of such a grid view screen shot of an exemplary music service is provided in FIG. 12. When the user tunes to a channel using this, or similar or equivalent views, where song or channel metadata is provided to the user, one may infer that the user 'likes' the particular song that they select.

2. Skip behavior: Programming experts have a general rule of thumb that the first time a user skips a song it might not count, but subsequent/repeated skips suggest that they do not like the song, or the artist in general. As with volume adjustment (see next) it is necessary that user actions be clearly distinguished from the noise floor. I.e. within the data that is captured with respect to skip behavior, it is necessary to look for statistically strong correlations for artist/title when determining if skips is an influencer. This can be assessed by comparing the frequency of skips after the user has heard it the song at least once, for particular artists/titles over the average, normalized by the frequency of play. The objective is to identify those artists/titles for which we have a high confidence that the users dislikes (skips).

3. Volume adjustment: The user often turns up the volume of a song they particularly like. To accurately track this, in exemplary embodiments of the present invention such a volume increase needs to be distinguished from noise floor. I.e. within the data that is captured with respect to volume increases/decreases, it is necessary to look for statistically strong correlations for artist/title when determining if volume adjustment is an influencer. This can be assessed by comparing the frequency of volume adjustments during a song (amount up/down) for particular artists/titles over the average, normalized by the frequency of play. The objective is to identify those artists/titles for which we have a high confidence that the users likes (turns up) or dislikes (turns down).

4. Alerts/Favorites/Presets: The user clearly likes music if they have registered alerts for it, or saved it as a favorite or preset.

5. User Psychoanalysis: Using a standard cognitive model and the subscriber's real-time feed data, in exemplary embodiments of the present invention the subscriber's mood can be understood and tracked, and thus predicted.

6. Weather: Weather influences how users feel, and it can be used it to weight songs based on whether they are, drab, melancholy, sunny, upbeat, etc. It is noted that there can be some overlap here with number 10, below, "upcoming events."

7. Version of Music: Often there are several recordings (instrumental, vocal, live, etc.) of a song or other audio content, and different users are known to have preferences for different types. These preferences may shift as well, with other variables changing.

8. Mobile Location/Vector: Songs can often be weighted based the location of the user, for example, New Mexico, New York, Quebec, Canada in general, etc. Songs may thus be weighed based on the tracked movement of the user, using categories such as, for example, Static, Walking, Jogging, Driving, Flying.

9. Mood (uses wrist device): In exemplary embodiments of the present invention, a user's mood can be gleaned based on his or her temperature, pulse rate, blood pressure, etc. In sophisticated extensions of this approach, chemical sensors can detect key biochemicals being produced by the user, such as hormones and pheromones. Such user mood predictors may be used to influence the weighting.

10. Upcoming Events: Any significant event that that may alter user song preferences may be integrated in weighting algorithms. For example, if a favorite artist is touring, which can further be refined based on location of the tour relative to the Subscriber, whether or not he or she has purchased tickets, and for which show, (data sharing with concert companies or credit card issuers would be needed), and degree of affinity of the user to the artist, and to which of his songs, at the time is known or calculated, all of this data may be used to adjust song weightings to favor the artist, and to further favor those songs that most resonate with the user.

11. User to User Similarity Inferencing: If User A likes Song_a, Song_b, and Song_c, and User B likes Song_a and Song_b, then one may infer that User B may thus also like Song_c. Numerous alternate inferences, of much greater complexity, are obviously possible and wholly advised. The power of such inferencing increases dramatically with the use of large data sets of users, social media mining, web analytics and crowd sourcing, as illustrated in FIG. 2.

12. "Exciting, Varied and New": There is a need to temporarily depress the weight for songs that have been heard recently, so as to keep the listener's experience exciting and new, as well as varied, with some surprises.

13. Song Social/Crowd/Web Scraping: A user's interest in a song can be gleaned from analysis of social media/crowd sourcing and web scraping sites, as noted above. These may include Twitter, Facebook, Instagram, Whatsapp, Pinterest, and a variety of ever changing "cool" sites and applications. In exemplary embodiments of the present invention, some user preferences may be gleaned from apparatus and methods such as sliders and the like, all as set forth, for example, in PCT/US2013/029721, which published as WO 2013/134567, entitled "SYSTEMS AND METHODS FOR AUDIO ATTRIBUTE MAPPING", the disclosure of which is fully incorporated herein as if fully set forth.

C. Channel Rule Influence—Further Processing Of Candidate Songs

FIG. 5 illustrates generally the application of channel rule influence, according to exemplary embodiments of the present invention. Following the general presentation of FIG. 5, FIGS. 6-8 proceed to illustrate specific examples of the application of various channel rules. In exemplary embodiments of the present invention, the channel rules can operate on top of the probability calculations illustrated in FIGS. 3 and 4 and described above. The channel rules are thus, in that sense, superimposed upon various sets of songs, each of which has a play weighting W.

Exemplary rules associated with programming a broadcast channel, and their functions, may include the following, many of which are known those skilled in broadcast audio programming:

1. Closer—prefer items with values closer to the given value for the attribute;
2. Composite_segue_protection—prevent consecutive items for a defined set of attribute values;
3. Dual_min_time_separation—maintains a minimum time separation between songs with matching values;
4. Dual_segue_protection—prevent a last-first sequence of items for a dual item attribute;
5. Enabled_window—this selector will trigger when the current playlist position between start and start+length;
6. Every—when used as a selector, this rule will periodically trigger based upon the current playlist position;
7. Frequency_map—prefers tracks with a distribution of discrete attribute values according to the given discrete distribution map;
8. Frequency_range—this rule tests to see if an attribute matches a given value
9. Higher—prefer items with higher values for the attribute;
10. In_range—prefer songs with a numeric attribute that falls within a given range;
11. Match—this rule tests to see if an attribute matches a given value;
12. Match_any—this rule tests to see if an attribute matches any value in a given list of values;
13. Maximize_separation—prefer to keep tracks with the given attribute value far apart;
14. Min_time_separation—maintains a minimum time separation between songs with matching values;
15. Position—when used as a selector, this rule will trigger when the current playlist position is the given position;
16. Position_separation—enforces a min/max position separation for items (as opposed to time separation);
17. Segue_protection—prevent consecutive items for an attribute;
18. Self_segue_protection—prevent consecutive items for an attribute;
19. Sequence—prefer items that are ordered by the given sequence of values;
20. Sequence_quota—enforces a sequence quota;
21. Shuffle—randomizes order of songs;
22. Sort—prefer items ordered by increasing value for the given attribute; and
23. Time_quota—prefers tracks that meet a defined quota over time.

As noted in FIG. 5, in exemplary embodiments of the present invention, rules may be applied based on Rule weight, to prune out the songs that will not be played. Thus, as shown in FIG. 5, for a given User Ui, a Play Weighting W for User I, for Song j 510 may be further processed by Rule Application 520, which also takes as inputs the User's Play History 515, and outputs a set of candidates C 525 for that user for various time slots Tx (the next slot being Time k, then Time k+1 etc.). Thus, a candidate song C is a function of its User weighting Ui, its Song weighting Sj and a proposed Timeslot Tk. If not all the rules can be applied, a heuristic can be applied to select songs with a highest score, given some rule selection threshold. For example, if not all of the rules can be applied we may perform a min-max algorithm to select a highest score given some rule selection threshold. Thus, an exemplary method may try various combinations of rules, keeping track of the rule violation or "breakability" score as noted above. An example heuristic is provided later in this disclosure.

In exemplary embodiments of the present invention, next song selection can be based on computing weights for clusters of songs of highest weight, given play history. In some embodiments the look ahead M may be M=5, so a playlist of the next 5 songs may be determined. Thus, once a selection of candidates at time Tk 535 has been made, the candidates for times Tk+1 540, Tk+2, Tk+3, Tk+4 and Tk+5 545 may be calculated. In some embodiments, M=40 may be used for internal purposes for audio programming to assess the quality of the playlists generated by the rules, and M=200 may be used for internal purposes as a "stress test" to see if a playlist of 200 next songs can be determined by an exemplary system or process without breaking rules (or to establish how many rules will be broken) and ensure the playlist generator does not run out of songs.

Exemplary Channel Rule I—Segue Protection

FIG. 6 illustrates application of a first exemplary rule, that of segue protection. The rule prevents playing the same, or very similar, song twice in a row, and may be expressed as:

SegueProtection(Attribute,Weight), where:

Attribute (string) is any field in channel characterization, and

Weight (integer) is a rule weighting between 0 and 1000.

The interpretation of the rule is to not play a song that has a string that matches the attribute field immediately after a song with the same string in the field. Thus, for example, SegueProtection(Artist,100) means if at time $T\_(k-1)$ the music system plays song j that has artist A, it cannot play a song in time slot $T\_k$ that also has artist A. This rule has weighting of 100, i.e. it can be broken (in this example the rule weighting of 1000 is absolutely unbreakable and a weighting of 0 can be trivially broken). Similarly, the rule may be expressed in terms other attributes, such as Title, Album, or even Genre, for example, in the Attribute string. In exemplary embodiments of the present invention, the rule may be implemented as shown in FIG. 6, where, given the song playing at $T\_(k-1)$ 610, the rule is applied at 620, and thus the song j to be played at time $T\_k$ must be a Candidate that satisfies the rule 630, i.e., a candidate for the next song to be played cannot have the same attribute string as the song one timeslot earlier, as follows:

State Space Required Assuming we are Selecting Song at $T\_k$:

Song field details for $T\_(k-1)$—e.g. Artist (artist GUID)

In terms of logic, as shown in FIG. 6, for each Candidate song (which has been already weighted based on Song Selection Influencers and User Selection influencers, as described above):

IF Field Name (Artist) for Song $T\_(k-1)$=Field Name (Artist) for Candidate,

THEN set Candidate Weight=0.

Thus, the Channel Rule, here "Segue Protection", overrides the previously influencer determined weighting, and modifies that weighting W to now be 0, effectively making sure it will not be played.

Exemplary Channel Rule II—SelfSegue Protection

FIG. 7 illustrates application of a second rule, similar to the first exemplary rule shown in FIG. 6. The rule illustrated in FIG. 7 also deals with segue protection, but here the rule is limited to the case of "self segue protection." The rule only prevents playing the exact same song twice in a row, and may be expressed as:

SelfSegueProtection(Weight), where:

Weight (integer) is a rule weighting between 0 and 1000.

The interpretation of the rule is to not play a song that has just played, i.e., where GUID is the same, and GUID is Title. It is noted that this rule could also be accomplished using SegueProtection(Title,Weight).

Thus, for example, SelfSegueProtection(100) means if at time $t\_(k-1)$ the music system plays song j, it cannot play the same song in slot $t\_k$. This rule has weighting of 100, i.e. it can be broken (as noted, in this exemplary system the rule weighting of 1000 is absolutely unbreakable). The rule may be implemented as shown in FIG. 7, where, given the song playing at $T(k-1)$ 710, the rule is applied at 720, and thus the song to be played at time Tk must be a Candidate that satisfies the rule 730, or a candidate whose GUID does not match the GUID of the song played at $T(k-1)$, as follows:

State Space Required assuming we are selecting song at $T\_k$:

Song field details for $T\_(k-1)$—e.g. Title GUID

In terms of logic, as shown in FIG. 7, for each Candidate song (weighted based on Song Selection Influencers and User Selection influencers, as described above):

IF Song GUID for Song $T\_(k-1)$=Song GUID for Candidate,

THEN set Candidate Weight=0.

It is noted that this rule, expressed only in terms of song title, would preclude multiple versions of a given song, from being played one after the other. Thus, covers of the same song by different artists would be precluded. To allow covers, the rule would be expressed in terms of both Song Title and Artist.

Exemplary Channel Rule III—Frequency Distribution

Finally, FIG. 8 illustrates application of a third rule, somewhat different than the two segue rules described above. The rule illustrated in FIG. 8 deals with frequency distribution, or maintaining a desired mix of songs on a given channel of an exemplary music delivery system. The rule requires playing a song that conforms to a given frequency distribution as specified by the Distribution Rule. The Distribution is assumed to be over some system defined interval, such as, for example, over 100 songs, or a time interval of, for example, one hour. The rule may be expressed as:

FrequencyDistribution(Attribute,DistributionArray, Weight), where

Attribute (String) is the field that is to be used for specifying the frequency distribution;

DistributionArray (Array of Pairs of (AttributeValue,Frequency)) is the frequency distribution to be applied, based on the attribute;

AttributeValues must align with those defined for Attribute; and Weight (integer) is a rule weighting between 0 and 1000.

Thus, for example, an expression of this rule as:

FrequencyDistribution(Category,{(A1,0.5),(B1,0.3),(C1, 0.2)},1000)

means that the song to be selected at timeslot $T\_k$ should conform to the specified frequency distribution, and satisfy the (AttributeValue, Frequency) pairs as specified. This rule has, for example, a weighting of 1000, which means that it should not be broken. The rule may be implemented as shown in FIG. 8, where, given a category distribution as specified in the rule of (A1,0.5) 805, (B1,0.3) 810, and (C1,0.2) 815, for attributes A, B, and C, the song to be chosen to play at timeslot $T\_k$ 850 by application of the rule at 830, conforms so as to satisfy the frequency distribution. Thus, if it does not, its weight is set equal to zero, which means it will never be chosen, as follows:

State Space Required Assuming we are Selecting Song for $T\_k$:

Distribution information of songs over past hour for each AttributeValue in Attribute.

In terms of logic, as shown in FIG. 8, for each Candidate song (weighted based on Song Selection Influencers and User Selection influencers, as described above) this may be expressed as:

IF including Song in sequence conforms with distribution envelope,

THEN leave weight 'as is',
ELSE, reduce weight of Song to 0.
Add to #count.

It is noted that the last step (Add to #count) indicates that since this candidate song has been selected, the distribution information corresponding to the song should be adjusted to reflect that the song is to be played at T_k. Thus, when computing candidates for timeslot T_k+1 and further on, it is necessary to start with a distribution that assumes the candidate song has just been played in time slot T_k; this corresponds to incrementing the counter for the attribute value to which this song pertains.

It is noted that the category distribution specifies various categories of songs, e.g., A1, B1 and C1, as shown, and the distributions are fractions of 1.0, and together add up to 1.0. Thus, in the example of FIG. 8, 50% of the songs in any hour time interval should be from category A1, then 30% from category B1, and finally 20% from category C1 (the categories here being defined by an attribute value).

FIG. 9—Exemplary Sequencer Algorithm

Given the various layers of processing, described in detail above, that may be used to generate music recommendations, in exemplary embodiments of the present invention, an exemplary sequencer algorithm may be implemented, according to the exemplary pseudocode shown in FIG. 9, and reproduced below:

Basically, in this algorithm a set of potential song candidates is generated from W, the set of all overall weightings for (i) a given user Ui, for (ii) each song Sj. This set—"candidateSet"—is operated on by a workingRuleset to compute a Tracklist. It is noted, to remove confusion, that the variable "W" is here used both as the weighting of each song in the set, as well as the name of the set itself. As can be seen, the algorithm is recursive. Thus, if—given an operative ruleset—when the Candidate list is generated a full list of song candidates is not obtained, then the algorithm drops the rule with the lowest breakability score, and re-computes the Candidate list. In other words, if the implementation of a rule that is not so hard and fast is over-limiting the number of songs such that insufficient Candidates are being generated, that rule may be dropped. This process may continue as necessary, and additional rules thus being dropped from the workingRuleset, until a Tracklist of desired length is obtained. The duration over which this algorithm runs will be determined by the number of songs selected during GenerateCandidates, and their behavior with respect to the rules in the then operative workingRuleset.

As with many recursive algorithms, in an exemplary embodiment one begins with the basis case, and assumes that there is time remaining to compute a solution. It may be further assumed that in this exemplary embodiment we are looking at the last timeSlot before the lookhead limit. I.e.,

```
Lookahead = 5
PlayHistory={ }
SlotTime = 0;
For all songs compute S_j;
For User U compute W(U_i,S_j);
ruleset={R0, R1, R2, ... };
rulesDropped={ };
currentSequence={ };
// Generate a playlist
Sequence = ComputeCandidates(W,0,PlayHistory,ruleset,rulesDropped);
Return Sequence;
// Define ComputeCandidates
TrackList ComputeCandidates(W,T,currentSequence,workingRuleset,rulesDropped)
While (time remaining) {
   For SlotTime = (T .. Lookahead) {
      if (SizeOf(candidateSet = GenerateCandidates(W)) > 0) {
         For Each item in candidateSet apply workingRuleset given currentSequence using
State Info. {
If (All Weights in candidateSet == 0) {          // a deadend is reached - will need to
                                                 //relax rules
         Select highest probability scores from canditateSet;
         For each song in candidateSet {
            Tracklist(song) = currentSequence;            // Initialize this path
            Tracklist(song) = ComputeCandidates(W, SlotTime+1, {PlayHistory+S(i)},
               ruleset, rulesDropped) + S(i)} ;          // Breadth First, one method.
         }
         return Max(Tracklist); // May want to introduce some "randomness" here, e.g.
               //take not just Max, but a random song near the top.
      }
      else {
         workingRuleset={workingRuleset–lowest rule};     // There may be an alternate
                                                //way to select rules that are
                                                //dropped
         rulesDropped={rulesDropped+lowest rule};     //drop rule with lowest breakablilty
                                                //score
         Tracklist = {ComputeCandidates ({PlayHistory},SlotTime,ruleset,rulesDropped)}
      }
   }
 } else
      exit ("error not enough songs");
}
return Tracklist;
// DefineGenerateCandidates
candidateSet GenerateCandidates(W)
Select a set of candidates from W in accordance with some algorithm, e.g. random
selection, etc.
Return candidateSet;
``` for a lookahead of five songs, we begin with slot number five. Then, for each song in the user's weighted song library W, we apply in turn each of the rules in the ruleset, starting with the rules having the highest weighting. After completing this exercise, the weighted song library for that particular user has songs which are ranked with either weight=0, or with some positive affinity (weight). Obviously, those songs with weight=0 are poor candidates, those with weight>0 are better. The best candidates are those with the highest weight. Therefore, the function GenerateCandidates will select some number of songs from W using the GenerateCandidates call. In exemplary embodiments of the present invention, this may include selecting some number of songs at random from W and applying the rules, or, for example, selecting all the songs in W (which would be very many) and applying the rules, or, for example, selecting those songs in W above some defined threshold (e.g. the top 10%, or 20 from each quartile, etc.) and operating upon that subset. It is here noted that various possibilities may be implemented in any given solution, all of which are understood to be within the scope of the present invention.

Thus, for ease of illustration it can be assumed that for the basis case that there are seven songs, and, for example, that there is only one rule—say the SelfSegueProtection(100) rule, described above in connection with FIG. 7. Then, after GenerateCandidates is called, only those songs that are different from the previous song (i.e., the one at SlotTime LookAhead-1, or in our example, SlotTime=4) will have nonzero values. From this list of songs (i.e., all the candidates for SlotTime=LookAhead (=5 in this example)) we select the songs having the highest probability—i.e., those with the highest value of W (this will be the ordered list).

The algorithm next looks at the FOR loop and sees that recursion is complete (i.e., we are at the end of the loop) and therefore we do not need to call ComputeCandidates again; rather, we simply return the selected Tracklist (of one song) which is the Max(Tracklist). Thus, we have investigated all the rules, and selected the "best" song to fit this slot.

Illustrative Example For Sequencer Algorithm

The algorithm provided above is best understood via the following example (notably greatly simplified), comprising (i) seven songs, (ii) a single user, (iii) two rules and (iv) a look ahead of only 2 (i.e., there are only two time slots, 0 and 1).

Thus, let there be 7 songs indicated by two user-independent attributes: (a) Artist and Title, and (b) a (user independent) Song Influencer Weight $S_i$, as follows:

S1: Artist1, Title1, 0.9
S2: Artist2, Title2, 0.8
S3: Artist3, Title3, 0.7
S4: Artist4, Title4, 0.9
S5: Artist1, Title5, 0.5
S6: Artist2, Title6, 0.4
S7: Artist2, Title7, 0.9

Thus, we have a set of songs from four artists, where Artist1 has two songs, Artist2 has three songs, and Artists 3 and 4 each have only one song.

We further assume that we are computing a playlist for a user U1, who happens to have a slight identified preference for Artist4. Therefore the W(U1,Sx) weightings are as follows, with Song4, by Artist4 having the highest weighting of 0.9 (which Songs S1 and S7 also happen to have, albeit those songs do not have Artist4):

W(U1,S1): Artist1, Title1, 0.9
W(U1,S2): Artist2, Title2, 0.8
W(U1,S3): Artist3, Title3, 0.7
W(U1,S4): Artist4, Title4, 0.9
W(U1,S5): Artist1, Title5, 0.5
W(U1,S6): Artist2, Title6, 0.4
W(U1,S7): Artist2, Title7, 0.9

We further assume that there are two rules, R1 and R2, each with breakability weights, as follows: R1 is SelfSegueProtection(500), and R2 is SegueProtection(Artist,100), both as described above.

The algorithm then proceeds as follows:

```
Lookahead = 1
PlayHistory={ }
SlotTime = 0;
For all songs compute S_j; // as noted above
For User 1 compute W(U_1,S_j); // as noted above
ruleset={R1,R2};
rulesDropped={ };
currentSequence={ };
```

We start with:
Sequence=ComputeCandidates(W,0,ruleset,rulesDropped)

Assuming there is processing time available, this in turn results in the outermost FOR loop:
FOR slottime=(0 . . . 1)

We then generate a set of candidate songs from which we can examine solutions for this iteration:
if (SizeOf(candidateSet=GenerateCandidates(W))>0) {

For this example we can use the entire song library of 7 songs, therefore the size of candidateSet is 7.

We then examine, for each song in W, the applicability of the song given the ruleset:
For Each item in candidateSet apply workingRuleset given currentSequence using State Info. {

Thus, for W(U1,S1) we apply rule R1. This rule is not broken since there is no preceding song. We then apply rule R2. This rule is also not broken since there is no preceding song. We repeat this for W(U1,S2), W(U1,S3), . . . until we complete the analysis with W(U1,S7). For this first iteration all weights are unaffected. We then select the highest of these (here we will only select the first one having the highest weight, but the algorithm permits several of the highest weights to be selected). This is W(U1,S1).

We then recursively select the next song in the sequence assuming this song has been played.
Tracklist(song)=ComputeCandidates(W, SlotTime+1, {PlayHistory+S(i)}, ruleset, rulesDropped)+S(i)}; //Breadth First, one method.

Here it is appreciated that we are now looking at slotTime 1, and we are starting with an assumption that we have already played S1. I.e., we are conjecturing what to play in slotTime 1, given that we have already played song S1 at slotTime 0.

As before, we can select any song from the set available. We examine for each song in W the applicability of the song given the ruleset:
For Each item in candidateSet apply workingRuleset given currentSequence using State Info. {

Thus, for W(U1,S1) we apply rule R1. This rule IS broken since the song violates the SelfSegueProtection, so we set W(U1,S1)=0. We repeat this for W(U1,S2), W(U1,S3), etc., until we complete the analysis until we complete the analysis with W(U1,S7). We then apply rule R2. This rule IS broken by song S5, since it has the same artist, Artist1, as S1, which we just played. For this second iteration we have:
W(U1,S1): Artist1, Title1, 0.0
W(U1,S2): Artist2, Title2, 0.8
W(U1,S3): Artist3, Title3, 0.7

W(U1,S4): Artist4, Title4, 0.9
W(U1,S5): Artist1, Title5, 0.0
W(U1,S6): Artist2, Title6, 0.4
W(U1,S7): Artist2, Title7, 0.9 and the only changes to the song weightings in the set W are those of S1 and S5, which are now equal to 0.0, because S1 was just played in slotTime 0.

We then select the first song having the highest weighting of these remaining songs (for the example we will only select the highest, but the algorithm permits several to be selected). This is W(U1,S4) which has weight of 0.9

We therefore return with Tracklist={W(U1,S4)}.

The preceding invocation therefore returns with Tracklist={W(U1,S1),W(U1,S4)}. It is also noted that three of the songs actually had the same weight, and either of them could have been chosen for each timeslot. We simply chose the first one in the sequence of songs that had the highest weight, thus the first iteration for slotTime 0 chose S1, and the second iteration, for slotTime 1, chose S4. It is understood that we could have also applied a rule that more highly weights songs with a user preferred artist, which would have chosen S4, with Artist4, in, for example, slotTime0.

It is here further noted that there is a desire or need to ensure randomness in selecting from song candidates, so as to insure variability. Thus, at the step "Select highest probability scores from candidateSet" one may use, for example, a distribution to select from the songs per their weighting, and not just choose only the top weighted songs from the weighting list. The reason for this is that we are likely to get a preponderance of songs driven from the users weighted preferences if we do not permit some randomness and variation. Of course, while the rules will insure some diversity, at the same time a balance is needed between satisfying user preferences and exploration of new songs.

Using Channel Playlist Frequency Distributions for Affinity

As noted above, the systems, apparatus and methods of the present invention are not limited to just song selection. Rather, audio content of various genres or types may be sequenced as described above, and then combined in a variety multi-genre audio program tracklist. This is shown, for example, in FIG. 10, showing a Music Sequencer Module 1030, a Talk Sequencer Module 1033, a Sports Sequencer Module 1035, and a Comedy Sequencer Module 1037. The four modules operate identically as described above, and their respective outputs, essentially the Tracklist returned by the exemplary program of FIG. 9, may be combined in a "Mashup" 1050 to form an integrated, curated, multi-content type program.

In addition to the combination of various content types, FIG. 10 also illustrates two additional outputs to user, one entitled "YMAL" 1060, the other "MLT" 1063. These acronyms stand for "You May Also Like" and "More Like This", respectively. These outputs are *additional* audio clips that a user may access based on affinities to the Tracklist currently being played to him or her. Thus, in addition to the Tracklist generated by the various Sequencers 1030, 1033, 1035 and 1037, and combined in the Mashup module 1050, if a user is particularly interested in what he is currently hearing, affinities to the then current Tracklist (or combined MashupList) can be calculated by the music delivery service and be offered to the user. These affinities are not subject to the defined rules under which the Sequencer algorithm operates as described above, but rather allow looser affinities, for a user who wants to explore similar, but varied, audio content.

YMAL 1060 and MLT 1063 can be implemented not just on a personalized music channel, such as described above, but also in connection with a standard broadcast channel, such as is found on a satellite radio broadcast.

Thus, in exemplary embodiments of the present invention, the exemplary affinity computations of the Sequencer shown in FIG. 3, can be used to support YMAL and MLT, as shown in FIG. 10 for any or all of (i) channel to channel, (ii) channel to episode, (iii) episode to episode, (iv) artist to artist, (v) artist to song, (vi) artist to channel, etc., similarities based on frequency counts of songs on the main channel, as output by any of the four sequencers 1030, 1033, 1035 and 1037 shown in FIG. 10, or in any combination of them if combined in a Mashup 1050 as also shown in FIG. 10. To support YMAL,1060 and MLT 1063, basically over the five out buffer we may compute a normalized score (0 . . . 1) of the frequency of particular artists, titles, etc., and then use these frequency tallies for affinity (e.g., on the SXM Broadcast Radio Service "Blend" is most like "Pulse" and "90s on 9" based on playlist distributions).

In alternate exemplary embodiments of the present invention, an alternate sequencer algorithm to that shown in FIG. 9, using another way to handle the weighting, indicated in FIG. 11 and reproduced below, may be used.

```
Lookahead = 5
PlayHistory={ }
SlotTime = 0;
For all songs compute S_j;
For User U compute W(U_i,S_j);
ruleset={R0,R1,R2,...};
rulesDropped={ };
currentSequence={ };
// Generate a playlist
Sequence = ComputeCandidates(W,0,playHistory,ruleset,rulesDropped);
Return Sequence;
// Define ComputeCandidates
TrackList ComputeCandidates(W,T,currentSequence,workingRuleset,rulesDropped)
While (time Remaining) {
    if (T == Lookahead){
        return currentSequence:
    }
    if (SizeOf(candidateSet = GenerateCandidates(W,workingRuleSet)) > 0) {
        for Each item in candidateSet apply MAX(workingRuleset) given currentSequence using State Info. {
            if (item in candidateSet failed Rule given currentSequence using State Info.) {
                // Assume this is the best we can do, set the weight, and start next iteration
                W(item) = W(item)-weight of Rule that failed
                workingRuleset={workingRuleset-lowest rule};          // May be alternate ways to select rules that are
```

-continued

```
                                                            // dropped
            rulesDropped={rulesDropped+Rule};
            Tracklist = {ComputeCandidates ({PlayHistory},SlotTime,ruleset,rulesDropped)}
        }
        Select highest probability scores from candidateSet;
        For highest probability scores in candidateSet {
            Tracklist(song) = currentSequence;              // Initialize this path
            Tracklist(song) = ComputeCandidates(W, SlotTime+1, {PlayHistory+S(i)|, ruleset, rulesDropped) + S(i)} ; //
Breadth First, one method.
        }
        return Max(Tracklist); // May introduce some "randomness" here, e.g. take not just Max, but a random
                // song near top.
    } else return ( );
}
return Tracklist;
// DefineGenerateCandidates
candidateSet GenerateCandidates(W,workingRuleSet)
    Select a set of candidates from W in accordance with some algorithm, e.g. random selection, etc.
    Assign weight to song based on Song/User influencers + SUM(rule weights for workingRuleSet)
Return candidateSet;
```

The approach of this alternate sequencer algorithm is similar in nature to the earlier approach (which was defined using recursion). The key concept in this alternate approach is that we associate with each song W(U,S) a song weight which is initially based on its own Song/User weight plus a sum of the rule weights in the rule set selected:

Assign weight to song based on Song/User influencers+ SUM(rule weights for workingRuleSet).

Then, for example, rather than setting the weight of a given song to 0 if a rule fails, as shown above, and running through all of the rules together as was described in the first sequencer algorithm described above, we instead reduce the song weight by the weight of the rule if the rule fails for that song, and run through other playlist candidate combinations. We then seek across all the viable candidates looking for the Max weighted path for the lookahead in a manner similar to the previously described sequencer algorithm. This approach still encourages the use of songs that have failed to meet some rules, rather than simply discounting them completely. It is also noted that if a song fails to meet several rules its weight will be successively decreased. The User/ Song influencers could either be added into the weight or kept separately, the choice being essentially a bookkeeping exercise.

Thus, for example, if the User/Song influencers are added into the weight, a common scale for the Song/User weights and the Rule weights may be chosen, such that both Song/ User weights and Rule weights have the desired relative contributory effect. This can be done by multiplying the rule weights by some factor, such as, for example, 0.001 which transforms the exemplary rule weight range shown above of 0-1000 to 0-1, which is comparable to the Song/User weightings of 0-1, for example. Alternatively it can be 0.002, etc., if the rule weights are desired to have greater effect, or a different factor to lessen their relative effect, for example. Or, it can be separately accounted for, and thus left alone in its original scale of 1-1000 for example.

In this alternate sequencer approach it should be noted that we initialize the song weight during GenerateCandidates based on the set of rules or workingRuleSet operative at that point:

```
/ DefineGenerateCandidates
candidateSet GenerateCandidates(W,workingRuleSet)
    Select a set of candidates from W in accordance with some algorithm,
    e.g. random selection, etc.
    Assign weight to song based on Song/User influencers + SUM(rule
    weights for workingRuleSet)
Return candidateSet;
```

Third Exemplary Playlist Generation Algorithm

In alternate exemplary embodiments of the present invention, an alternate sequencer algorithm to that shown in both FIG. 9 and FIG. 11, may be used, reproduced below:

Algorithm V3—Linear Playlist Generation without Recursion

```
Lookahead = 5
PlayHistory={ }
SlotTime = 0;
For all songs compute S_j;
For User U compute W(U_i,S_j);
ruleset={R0,R1,R2,...};   // rules are assumed ordered by weight
rulesDropped={ };
currentSequence={ };
// Generate a playlist
Sequence = ComputeCandidates(songLibrary,0,playHistory,ruleset,rulesDropped);
Return Sequence;
// Define ComputeCandidates
TrackList ComputeCandidates(W,T,currentSequence,workingRuleset,rulesDropped)
    WHILE (time remaining) {
        FOR SlotTime = (T .. Lookahead) {
            candidateSongs = W;
            workingRuleset = ruleSet;
```

```
FOR Each Rule in Ruleset {
    tempSongs = candidateSongs;
        candidateSongs = Apply rule to existing candidateSongs and filter out songs that do not comply with
current Sequence thru SlotTime, plus the candidate song
        IF (candidateSongs == 0) {
            // we could not satisfy all rules, return the candidates prior to last rule
            candidateSongs = tempSongs;
            break;
        } ELSE {
            // we could satisfy rule, go around loop again
            candidateSongs = candidateSongs;
        }
    }
    // pick highest weight song from candidateSongs to populate that slot.
    candidateSet[SlotTime] = MaxWeightSong(candidateSongs);
  }
}
return Tracklist;
```

Using Affinity Discovery To Improve/Inform Recommendations

As described above, an exemplary user's interest in a song can be gleaned from analysis of social media/crowd sourcing and web scraping sites. These may include, for example, Twitter, Facebook, Instagram, Whatsapp, Pinterest, and a variety of ever changing "cool" sites and applications, in many of which virtual communities are created or supported. Moreover, many applications now allow sharing of photographs and other content, and support chat rooms or ongoing chats between the poster or sharer, and all those with whom he or she has shared the content. For example, Dropbox Carousel is a photo sharing application supporting photo sharing and chat rooms in which to comment and discuss the shared content. Numerous similar services abound. In all these services the users have already created affinities between each other and between themselves (and other users) and certain content. All that remains to do is capture and analyze this data, from which powerful affinity and user preference information may be gleaned.

In exemplary embodiments of the present invention, understanding affinities between various content items can be key to making successful recommendations. For music sequencing, understanding affinities between users (subscribers), as well as those between users and songs to enhance recommendations may be essential.

In some embodiments, big data constructs (data cubes, statistical analysis etc.) maybe used to extract affinities between Songs (and between Users). As noted above, various demographic attributes can be extracted from social media data, including favorite artists, songs, sports teams, interests, etc. In some embodiments, analytics may be implemented to understand which artists are similar to other artists from social media feeds. There can be demographic analyses that can predict a user's likes based on other users' likes and preferences form the same demographic. Using social feed data, events of interest can be extracted, and song recommendations leveraging such knowledge generated. For example, if a certain demographic of users is posting on Facebook about an upcoming concert, members of that demographic may desire to hear that artist's songs at a higher frequency than normal, as part of the concert's "buzz." E.g., "Madonna is playing at Meadowlands Jul. 1, 2015" may be extracted from social feed data, and appropriate Madonna songs played prior to and following the event to users in a geographical demographic relevant to the Meadowlands, NJ draw area. Thus, for example, in general a system may identify the affinity for a user to an event leveraging Artist affinity data and user location data. This requires user affinity to artist, and event extraction by such analytics.

In some embodiments, novel cognitive modeling methods and techniques may be integrated into such an implementation, such as, for example, the IBM Human Cognitive Model, and similar systems. It is noted that one may often extract insight from interesting outliers. Thus, for example, credit card companies look for "unexpected" transactions, and flag them immediately. There are various analogous concepts in the song/content "buzz", chat and interest worlds on social media, which may be exploited to, for example, infer event, artist, song, etc. interest.

Given this general discussion, FIG. 13 illustrates various affinities of interest, in various exemplary embodiments of the present invention. Beginning at the upper left of FIG. 13, there are illustrated user affinities by songs 1301 and user affinities by artists 1303. The thinking behind user affinities is that two users, such as User 1 and User 2, have a certain probability between them that if one likes a song or an artist or an episode, etc., the other will as well. Continuing with reference to FIG. 13, there are other possible user affinities such as, for example, by Episode 1305, Show 1307, Channel 1311, Events 1313 and Alerts 1315. The center column of FIG. 13 illustrates affinities between content items, or programming structures in which content items are provided. Thus, song affinities are illustrated at 1317, and the song affinity construct is that songs of a similar "feel" will be liked by the same users, or by most of the same users. What constitutes "feel" must be reduced to certain attributes such as, for example, frequency range, lyrics, melody, instructions, vocals, percussions, or a variety of program attributes such as category, tempo, mood, etc. This allows a music service, for example, to recommend songs from other channels to the same user on a given channel. For example, suppose that in a given personalized music service there are separate channels for 70's music, 80's music and 90's music, and each of these channels plays a certain number of top songs from that decade. It so happens, especially where an artist's career spans multiple decades, that some songs from the early 90's are similar to songs from the late 80's. They could be from the same artist, or they could be from related artists, or they could be from totally different artists, each of whom captures the musical era. In such cases, acquiring or extracting song affinities can help enhance a given channel such as a 90's music "90's on 9", for example, with music from the late 80's or even 70's that would be equally appreciated by a user enjoying "90s on 9."

Continuing with FIG. 13, this concept is illustrated graphically using set notation at 1319. Channels such as "Pulse", "80s music" and "Blend", from the SiriusXM personalized music service, often have some interlap between them. As shown, these three channels have some songs which are elements of all three sets. Furthermore, there can be an artist affinity where data mining is used to match attribute or attribute profiles between various artists so as to predict if a user, U1, is a fan of Artist A, that user will also be a fan of Artist B. Another way to express this, as shown at 1320, is by expressing a probability that Artist A is like Artist B. Some of the attributes that may be used in such an artist affinity prediction can be user demographic popularity or social medial associations.

Additionally, one may inquire as to channel affinity, as shown in FIG. 13 at 1323. This inquiry seeks to answer the question: "what is the probability that a certain channel within a music service is similar to another channel?" and that can be, once again, determined by attribute matching, as shown at 1323, user demographic popularity, song frequency count and social media associations. Finally, as shown in the right most column of FIG. 13, there can be other types of affinities, such as item to item affinity as shown at 1330, item to item affinity based on word count shown at 1335, song based affinity as shown at 1337 and person based affinity as shown at 1339.

FIG. 14 illustrates an exemplary affinity computation according to some embodiments of the present invention. With reference thereto, there is an external environment 1410 which is accessed by an Artist Affinity From Social Media Updater 1450. The external environment can include, for example, the entire worldwide web. Such an updater, given certain attributes of songs within a channel, can improve the affinities between artists in that channel. The artist affinity updates are than passed to the artist_by_artist database 1437. Continuing with reference to the top of FIG. 14, there are seen three databases, one for each of Songs 1415, Users 1430 and Songs as defined by audio programming attributes 1440. These are next described. Songs database 1415 can be input to a User Affinity Updater at 1417 which seeks to improve user/song affinities given existing song affinities. In other words, if a User likes song A and song A has some affinity to song B, one may predict the user's affinity for song B. The updates are than are used to enhance or populate the user_by_song database 1420. Similarly, User database 1430 can be fed to an Artist Affinity Updater 1435 which seeks to improve the artist affinities given the existing user affinities stored in user database 1430. The output of the Artist Affinity Updater may also be fed into the artist_by_artist database 1437. Next, at 1440 there is a Song (Audio Program Attributes) database, which may be fed to an Artist Affinity By Audio Program updater 1445 which, given an attribute characterization of songs within a channel, seeks to improve the artist affinities. The output of that may also be fed to the artist_by_artist affinity database 1437. Finally at the bottom of FIG. 14 there is an Audio Programming Input module 1460 which may, for example, be fed to a Channel Affinity Updater 1465. This latter updater is a simple tool that permits audio programming to input channel affinities. The output of that is sent to a channel_by_channel affinity database 1467. It is noted that channel affinities are similar to what is illustrated in FIG. 13 at 1319, where, if there are a number of intersections between various channels either two or three or more, at some point those channels have a certain affinity inter se which can be calculated and that is the job of Channel Affinity Updater 1465. For example, Top 20 Hits will likely have some overlap with Pulse, for example, which is a mix of adult contemporary hits, and of course draws on some of the similar material as then current Top 20 Hits, but is somewhat broader.

It is noted that in exemplary embodiments of the present invention, granular personality charts may also be used in connection with affinity discovery, as well as community discovery tools to chart possible demographics based on various possible commonalities. In the era of deep learning applications, the science of how and why people like a given piece of audio content is upon us. Given a deep psychic profile of a user that can be inferred from the now ubiquitous digital track everyone creates via social media of various types, one can learn user to song, and user to user affinities in a way never before possible. Thus, in exemplary embodiments, a music recommendation service can truly serve to a user what he or she really wants to hear, in the mix and sequence he or she finds most aesthetically pleasing—even if he or she does not even yet know what that is, or how to begin to describe it!

Non-Limiting Software and Hardware Examples

Exemplary embodiments of the present invention can be implemented as one or more program products, software applications and the like, for use with one or more computer systems. The terms program, software application, and the like, as used herein, are defined as a sequence of instructions designed for execution on a computer system or data processor. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The program(s) of the program product or software may define functions of the embodiments (including the methods described herein) and can be contained on a variety of computer readable media. Illustrative computer readable media include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such computer readable media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

The present invention may be realized in hardware, software, or a combination of hardware and software. It may have components located in one locale, or one logical locale, such as on a server or servers of a music service, or the like, or it may distribute processing across various modules, not collocated. For example, a music service may have servers which communicate across various communications networks with client or user smartphones, computers, media players or other similar devices. While most processing would generally be on the server, complex algorithms may off load partial processing to local client devices, where the user preference, listening history, and dynamic personal data are (such as interactions on social media such as Facebook, activity on a sharing service such as Dropbox, messaging via SMS or Whatsapp, location data, etc.) Thus, a system according to a preferred embodiment of the present invention can be realized in a centralized fashion in one computer system, or in a distributed fashion where different elements are spread across several interconnected computer systems, including cloud connected computing systems and devices. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Each computer system may include, inter alia, one or more computers and at least a signal bearing medium allowing a computer to read data, instructions, messages or message packets, and other signal bearing information from the signal bearing medium. The signal bearing medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the signal bearing medium may comprise signal bearing information in a transitory state medium such as a network link and/or a network interface, including a wired network or a wireless network, that allow a computer to read such signal bearing information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. The above-presented description and figures are intended by way of example only and are not intended to limit the present invention in any way except as set forth in the following claims. For example, various exemplary embodiments may have more complex, or less complex rule sets, using many or few Attributes. Additionally, while this disclosure speaks in terms of "songs" as noted above its techniques and systems are applicable to *any* type of content clip, both audio and video. It is particularly noted that persons skilled in the art can readily combine the various technical aspects of the various elements of the various exemplary embodiments that have been described above in numerous other ways, all of which are considered to be within the scope of the invention.

What is claimed:

1. A computer-implemented method of generating an audio clip sequence to be played to a user, the method comprising:
   selecting, by at least one processor, a set of audio clips;
   calculating, by at least one processor, one or more user-independent weightings for each clip in the set;
   calculating, by at least one processor, one or more user-dependent weightings for each clip in the set;
   combining, by at least one processor, the user independent and user dependent weightings into an overall weighting for each clip, for a user, to generate an overall weighted set of audio clips;
   selecting, by at least one processor, a set of candidate clips including a predetermined number of clips from the overall weighted set of audio clips, the selecting includes:
   applying, by at least one processor, a set of rules having respective rule weights to the overall weighted set of audio clips and adjusting the overall weighting of each audio clip based at least in part on the applicable rule weights;
   sequencing, by at least one processor, the selected set of candidate clips into a plurality of consecutive timeslots of audio clips to be played to the user;
   selecting a next song based on a computed weight of a cluster of the candidate clips, wherein the next song is based on a highest computed weight; and
   on a condition that at least one rule of the set of rules is violated by an audio clip, set the weight of that audio clip to zero, unless there are insufficient audio clips in the candidate set to generate an audio clip for a given timeslot.

2. The method of claim 1, wherein the user independent weightings are based at least in part on at least one of:
   time/basic dayparting, data obtained from social media/crowd/web scraping, song popularity distribution, revival perspective, resurgence of artist, societal events, artistic period, or aggregated internal global user profile statistics.

3. The method of claim 1, wherein the user-dependent weightings are based at least in part on at least one of: user preference, user listening history, channel change, skip behavior, alerts/favorites/presets, user psychoanalysis, weather, version of music, mobile location, mood, upcoming events, user to user similarity, results of social media, crowd sourcing or web analytics analyses.

4. The method of claim 1, further comprising at least one of:
   offering to the user audio clips for play that have an affinity to a set of most recent media clips that were played,
   offering to the user clips for play that have an affinity to a set of most recent media clips that were played, wherein the affinity is at least one of (i) channel to channel, (ii) channel to episode, (iii) episode to episode, (iv) artist to artist, (v) artist to song, or (vi) artist to channel, or
   offering to the user clips for play that have an affinity to a set of most recent clips that were played, wherein the affinity is calculated based on frequency counts of said most recent songs played.

5. The method of claim 1, wherein at least one of:
a tracklist is generated for each of two or more genres of audio content, and the tracklists are then combined in a mashup to generate a mixed audio content output; or
a tracklist is generated for each of two or more genres of audio content, and the tracklists are then combined in a mashup to generate a mixed audio content output, and the genres of audio content include any of talk, music, comedy, sports, and news.

6. The method of claim 1, wherein said selecting audio clips to obtain a candidate set includes one or more of:
   (i) selecting some number of songs at random from the overall weighted set and applying the rules,
   (ii) selecting all the songs in the overall weighted set,
   (iii) selecting those songs in the overall weighted set above some defined threshold,
   (iv) selecting the top 10% weighted songs in the overall weighted set, or
   (v) selecting a defined number N from each quartile.

\* \* \* \* \*